United States Patent [19]

Hewko

[11] Patent Number: 5,490,703
[45] Date of Patent: Feb. 13, 1996

[54] PATIENT TRANSPORT SYSTEM

[75] Inventor: Barry J. Hewko, Sidney, Canada

[73] Assignee: Vancouver Island Helicopters Ltd., Sidney, Canada

[21] Appl. No.: 72,569

[22] Filed: Jun. 4, 1993

[51] Int. Cl.$^6$ .............................. A61G 3/00; B64C 1/22
[52] U.S. Cl. ...................... 296/19; 244/118.6; 244/137.2
[58] Field of Search .................. 296/19, 20; 244/118.1, 244/118.5, 118.6, 137.1, 137.2; 5/118; 414/402, 584

[56] References Cited

U.S. PATENT DOCUMENTS

| | | | |
|---|---|---|---|
| 2,085,043 | 6/1937 | Richter | 414/522 |
| 2,186,848 | 1/1940 | Uhlir | 280/408 |
| 2,196,265 | 4/1940 | Krogh | 414/522 |
| 2,229,483 | 1/1941 | Toulmin, Jr. | 414/522 |
| 2,573,496 | 10/1951 | Runkle | 414/522 |
| 3,204,998 | 9/1965 | Stollenwerk | 296/19 |
| 4,071,210 | 1/1978 | Mutke | 296/19 X |
| 4,078,269 | 3/1978 | Weipert | 5/611 |
| 4,093,303 | 6/1978 | Nelson | 296/65.1 |
| 4,097,941 | 7/1978 | Merkel | 5/81.1 |
| 4,115,884 | 9/1978 | Keogh | 5/625 |
| 4,178,032 | 12/1979 | Hone | 296/19 |
| 4,301,984 | 11/1981 | Olason | 244/137.1 |
| 4,378,128 | 3/1983 | Holling et al. | 296/19 |
| 4,457,663 | 7/1984 | Hems et al. | 414/522 |
| 4,485,504 | 12/1984 | Lehmann | 5/628 |
| 4,488,326 | 12/1984 | Cherry | 14/72.5 |
| 4,526,346 | 7/1985 | Galloway et al. | 254/122 |
| 4,549,720 | 10/1985 | Bergenwall | 254/124 |
| 4,555,211 | 11/1985 | Metz | 414/401 |
| 4,558,648 | 12/1985 | Franklin et al. | 108/147 |
| 4,577,821 | 3/1986 | Edmo | 108/145 |
| 4,637,575 | 1/1987 | Yenzer | 244/118.5 |
| 4,655,466 | 4/1987 | Hanaoka | 280/47.371 |
| 4,712,653 | 12/1987 | Franklin et al. | 187/18 |
| 4,783,025 | 11/1988 | Moffett | 244/118.5 |
| 4,783,109 | 11/1988 | Bucalo | 296/20 |
| 4,805,954 | 2/1989 | Lazaroff | 296/65.1 |
| 4,824,158 | 4/1989 | Peters et al. | 296/37.6 |
| 4,890,692 | 1/1990 | Oakman | 182/141 |
| 4,923,357 | 5/1990 | Isogai | 414/495 |
| 4,957,121 | 9/1990 | Icenogle et al. | 128/897 |
| 4,979,592 | 12/1990 | Isogai | 187/8.72 |
| 4,984,774 | 1/1991 | Zupancic et al. | 5/601 |
| 5,054,578 | 10/1991 | Smillie, III et al. | 182/63 |
| 5,092,722 | 3/1992 | Reazer, III et al. | 410/104 |
| 5,105,915 | 4/1992 | Gary | 187/18 |
| 5,135,350 | 8/1992 | Eelman et al. | 414/786 |

Primary Examiner—Andrew C. Pike
Attorney, Agent, or Firm—Graybeal Jackson Haley & Johnson

[57] ABSTRACT

A system for transferring patients to and from emergency medical vehicles and for securing the patients within the vehicles during transport is particularly adapted for helicopters, with at least two stations within the helicopter for securing two patients therein. The system accommodates standard stretchers or patient litters, including a first litter positioned in the first station in the rear of the aircraft approximately aligned with but above and behind the second patient station. In order to load the patients into the separate stations, interlockable trays and support plates are used. An upper tray is initially telescoped within a lower tray which, in turn, is supported on a carriage and lift assembly. The lower tray can be swung relative to the lift assembly to an oblique position pointed toward the exterior door of the helicopter. In addition, the lower tray, with the upper tray supported thereon, can be raised so that the upper tray can be slid rearward into the second station. Each tray has mechanism for locking a patient litter securely in the tray.

4 Claims, 35 Drawing Sheets

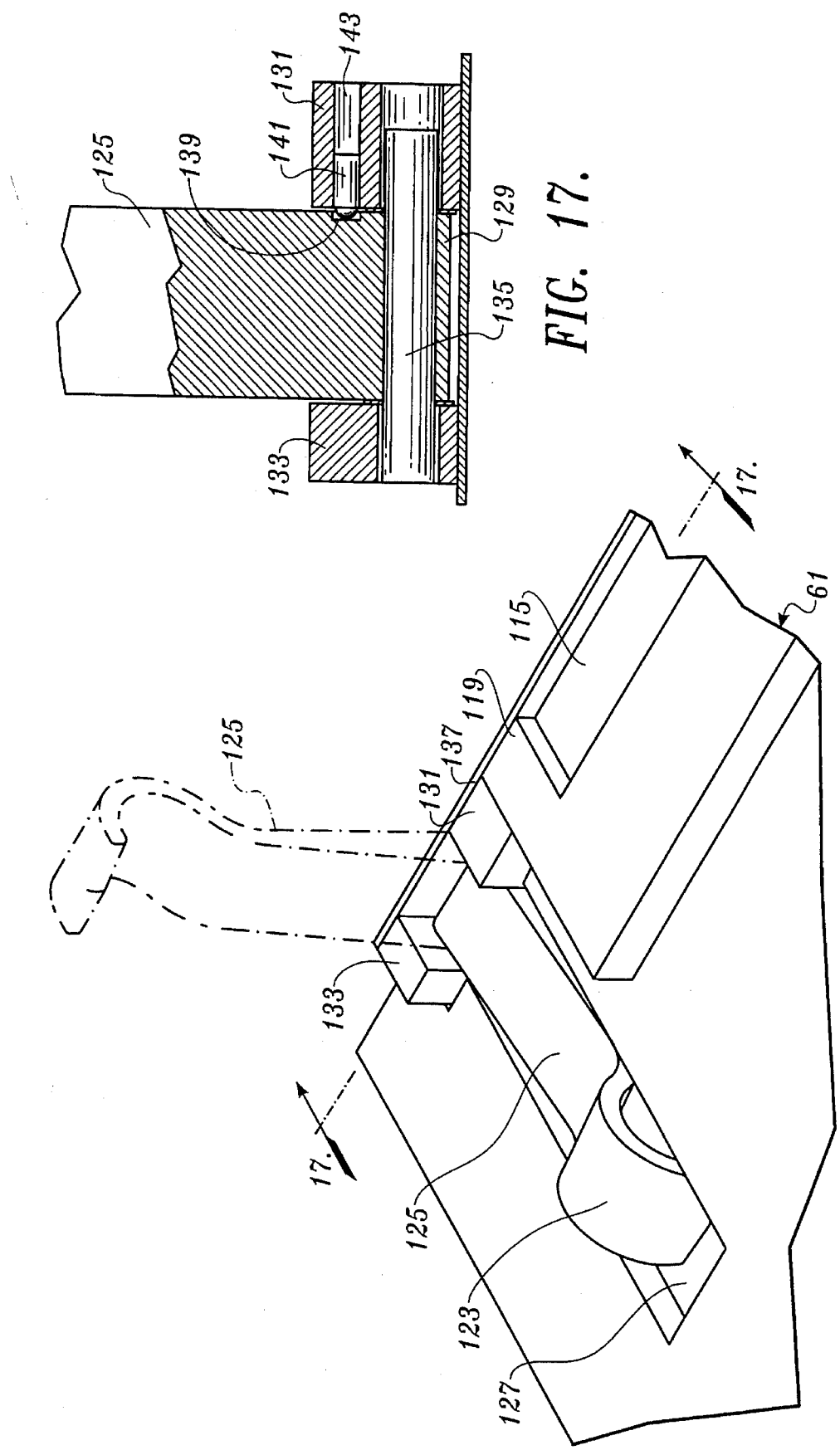

PATIENT TRANSPORT SYSTEM

FIELD OF THE INVENTION

The present invention generally relates to transferring and transporting patients in emergency medical vehicles, and more specifically relates to helicopters having interiors designed for quick, convenient, and safe transfer and transport of a plurality of patients and medical attendants.

BACKGROUND OF THE INVENTION

The medical profession has long recognized the correlation between the time it takes a patient to receive medical attention and the success and cost of treating the patient. The time it takes a patient to receive medical care and the quality of that care, both immediately after an accident (or unexpected illness) and during transportation to a permanent medical facility, are major factors in the probability of the patient's survival and the patient's recovery rate. Rapid transportation combined with proper training and education of on-site attendants have become important considerations in sophisticated health care delivery systems.

Aircraft, specifically helicopters, are commonly used to transport seriously injured patients to health care facilities. In order to use aircraft for medical purposes, the aircraft interior must be capable of accommodating the equipment and supplies necessary for proper care during transportation, in addition to one or more medical attendants who should have convenient access to the equipment, supplies, and, most importantly, the patient.

Present emergency medical vehicles, both ground and air, have a variety of equipment and supplies on board to serve the health care needs of patients having different injuries and illnesses. In many instances, the equipment and supplies must be installed and stored in confined spaces. In this regard, the interior of the vehicle must be well planned to ensure the accessibility of the attendant or attendants to the equipment, supplies, and the patient or patients.

Weight is an important factor when designing aircraft interiors. Specifically, the components of the interior of an emergency medical vehicle must be small and lightweight without sacrificing strength. While weight and strength are factors for both ground and air vehicles, they are particularly important for aircraft, considering the speed of the aircraft and the potential for heavy impacts wherein components must be lightweight yet strong. Currently, there is a trend to design components of aircraft interiors to withstand 16 g forward crash forces, which far exceeds requirements for ground vehicles; this requirement places even greater emphasis on the aircraft interior design and layout, and the equipment and components making up the medical interior.

Aircraft adaptable to medical missions can generally accommodate the weight of at least three passengers and up to as many as 32 passengers depending on the size of the aircraft. However, when one or more of the passengers is being transported in a prone position (as is necessary for medical purposes), the arrangement of the cabin interior affects the efficiency of treating the patient and the ability to accommodate a maximum patient load. If the interior is not properly configured, an aircraft readily capable of transporting two or more patients may be limited to a single patient. Hence, additional trips must be made with the aircraft, thereby increasing the expense in transporting two or more patients to a medical facility. Ultimately, the weight-carrying performance capability of the aircraft remains an unused resource. In addition, while the interior of some aircraft may be designed for two or more patients, inefficiencies in design of the interior can result in attendants preferring that only one patient be transported at a time due to inaccessibility to the patients when two or more patients are transported together, or wherein the equipment necessary to carry the second patient is so cumbersome that the attendants remove it from the aircraft, making it unavailable when needed. The culmination of inefficient medical vehicle interiors is a financial waste and a heavy burden on the medical facility sponsoring the vehicle, which is ultimately passed on to the patient and/or the patient's financial provider.

If a particular medical facility or geographic region needs an aircraft that accommodates two or more patients, but cannot justify—from a cost-based analysis—the purchase and operation of an aircraft large enough to accommodate two or more patients, the facility must make due with a smaller aircraft. In this regard, if there were an efficient aircraft medical interior design which would allow the smaller aircraft to readily accommodate two or more patients, the health care delivery service would not be compromised because of its choice to operate a smaller aircraft due to limited financial resources.

During transfer and transportation of injured and/or ailing patients to a medical facility or between medical facilities by an emergency medical vehicle, such as an ambulance, helicopter, or airplane, the patient is usually carried on a stretcher. While on the stretcher the patient frequently requires the aid of portable medical equipment such as monitors, defibrillators, oxygen tanks, intravenous bags, and intravenous pumps. The equipment must be continually located close to and often be connected to the patient during transport from the scene of the trauma or transferring medical facility, on the stretcher into the emergency medical vehicle, during the vehicle ride, and, subsequently, out of the vehicle to the proper location in the destination medical facility. The equipment should also be easily removable as a unit.

Time, space, and manpower are the principle constraints. Only one or two attendants are typically available to serve the patient's needs during the entire transfer and transportation process. These attendants cannot efficiently or effectively attend to the patient's medical needs and carry all the necessary equipment while transporting the patient. Space is also limited due to the small size of the vehicle. If more than one patient is being transported in the same vehicle at the same time, space for medical equipment for each patient is even more limited. Hence, there is a further need for a patient transporting vehicle to be readily adaptable to carrying equipment not necessarily considered a permanent part of the aircraft interior.

One example of a prior art device to move equipment with a stretcher is disclosed in U.S. Pat. No. 4,783,109 (Bucalo). The patent describes a frame structure clamped to a stretcher for holding medical equipment. The structure provides shelves for medical equipment. However, the structure is not quickly removable from the stretcher. The clamps are screwed together onto the stretcher frame so as to remain permanently with the stretcher. The structure also does not provide places to support clamp-on or hanging equipment or supplies such as intravenous bags, intravenous pumps, and monitors.

No efficient method or apparatus is known for supporting a number of pieces of portable medical equipment in such a way that they are close to the patient, transportable with the patient and stretcher, and yet easily removed as a unit.

In ambulances and other emergency/rescue vehicles such as helicopters, removable stretchers or patient litters are often provided for convenient and comfortable patient transfer and transportation. The litters for emergency medical aircraft use are somewhat standard, most using a Ferno #9 litter or the like. Such litter includes a structural tubular frame to provide lightweight support for the patient. The litter includes wheels to support its head end and legs to support its foot end. Once the patient is carried or rolled on the litter to the helicopter, the litter is placed within the helicopter and fastened into position for safe transportation.

When a stretcher or litter is placed within an emergency medical vehicle, it must be secured in place to prevent upset or injury not only to any patient who may be lying on the stretcher, but also to others nearby. However, for efficiency and safety, several other considerations exist beyond simply positively securing the litter within the vehicle. Any stretcher securing or locking system must be easy to use since time is often a critical factor and delays can be costly. The system should also be constructed to secure standard litters. Another consideration is space. The locking system should be small with a flat cross section, especially when not in use, to avoid catching on persons, objects, or portions of the litter. The locking system must also be clear of other tables or trays that may be used above or below the locking system.

Several devices have been developed to secure a stretcher or litter for air or ground transport, all with various drawbacks and limitations. U.S. Pat. No. 4,115,884 (Keogh) discloses a litter supporting and locking structure adopted for use in aircraft. The patented device allows a litter to be mounted above aircraft seats with hooks securing the frame of the litter. However, the litter must be carefully placed within these hooks, which may be time-consuming and awkward when a person is supported on the litter. The system disclosed may not be convenient for helicopters or other aircraft with tight space requirements.

U.S. Pat. No. 5,092,722 (Reazer, III et al.) discloses another fastening device for stretchers or litters, including a longitudinal guide track with walls that hold a special projection from the litter and prevent it from moving laterally or vertically. Locking gates along the track impede longitudinal movement once the litter is in place. This device, however, will not secure standard aircraft litters without modification to include the special projections.

Frequently, more than one patient must be transported simultaneously. To be able to use the same vehicle, more than one station or table on which to secure stretchers or litters must be provided so that two or more can be safely and conveniently secured within one vehicle. However, space may be quite limited such that extra tables may be awkward to keep on board or hazardous in an emergency landing if the second litter is inadvertently left unsecured. Since an extra table must be kept clear while loading the first patient on the first litter or when loading only one patient and since adequate space may not exist to fold up and store an extra table when not in use, it may become cumbersome for the medical attendants to continually reposition the second litter. The attendants may choose not to use the second litter thus reducing the aircraft to a single patient aircraft. Therefore, a need exists for an apparatus including at least two litter tables or supports to secure litters while not interfering one with another.

Considering the limitations and disadvantages of the devices and methods currently in use, it should be apparent that effective solutions to the problems of transferring and transporting patients in an emergency medical vehicle, such as a helicopter, including necessary equipment and supplies, and releasably securing a stretcher or litter within the vehicle are not provided in the known prior art.

SUMMARY OF THE INVENTION

The present invention provides a system for transferring patients to and from emergency medical vehicles and for securing the patients within the vehicles during transport. In the preferred embodiment, the system is adapted for aircraft, particularly helicopters, with at least two patient supports or stations within the helicopter for securing two patients therein. The system accommodates standard stretchers or patient litters, so that a patient need not be transferred from one type of cot or table to another, but can remain on the standard litter during the transfer and transport procedure.

More specifically, in the preferred embodiment the aircraft interior is configured to have a first patient station in the rear of the aircraft approximately aligned with but above and behind a second patient station. The patients are loaded head forward such that the heads and chests of both patients are exposed for convenient access by an attendant or attendants. The patients are positioned toward one side of the aircraft, leaving room for attendants at the other.

In order to load the patients into the separate stations, interlockable trays and support plates are used. An upper tray is initially telescoped within a lower tray and can be swung to an oblique position pointed toward the exterior door of a helicopter. The upper tray is adapted to receive the standard stretcher or patient litter thereon, and includes mechanism for locking the litter in position on the tray. Thereafter, the upper tray can be retracted into the lower tray, whereupon the assembly of telescoped trays can be swung inward to a position extending longitudinally of the aircraft. A lift assembly raises the interfitted trays such that the upper tray can be slid rearward into a bedplate assembly located in the aft portion of the aircraft cabin. The upper tray is separable from the lower tray after insertion into the bedplate. The lower tray is lowered by the lift assembly, and then is swung to the oblique position to receive a second patient litter through the exterior door. Finally, the second tray with the second patient litter secured thereon is swung to a longitudinally extending position along one side of the aircraft cabin.

Preferably each tray has shallow grooves or tracks for the supporting posts and rollers of the standard stretcher or patient litter. At one end of the tray upright retainers are positioned to hook over the litter frame, whereas at the other end of the tray an axle locking assembly is provided including hooks for fitting over the axle of the litter. Identical locks are provided for both trays.

Preferably the lower tray is mounted directly on a carriage and lift assembly. Releasable locking mechanism is provided to secure the lower tray in position extending longitudinally of the aircraft. When released, such locking mechanism permits the lower tray (and the upper tray if still supported thereon) to be swung toward the door opening at one side of the aircraft. The lift assembly also can be moved transversely of the aircraft, with locking mechanism being provided for securing the lift assembly in a desired transversely shifted position.

In accordance with another aspect of the invention, a special tray or bridge is provided which can be secured over a patient supported on a stretcher or litter. The bridge is used to support a variety of medical equipment which can be transferred and transported with the patient.

BRIEF DESCRIPTION OF THE DRAWINGS

The advantages of this invention will become more readily appreciated as the same become better understood by reference to the following detailed description, when taken in conjunction with the accompanying drawings, wherein:

FIG. 16 is an enlarged detail perspective of a component of the litter securing mechanism of FIG. 15, with parts broken away;

FIG. 17 is a further enlarged detail side elevation of the litter retaining component of FIG. 16, with parts shown in section;

DETAILED DESCRIPTION OF THE PREFERRED EMBODIMENT

For purposes of describing the details of the preferred embodiment of the present invention, the preferred embodiment will be limited to an aircraft interior, specifically components of an interior for helicopters used for the transportation of injured patients. This includes both on-scene work, where the aircraft picks up the patient directly from the scene of an accident, and the transportation of patients from one location to another, such as from one medical center to a different medical center.

The preferred aircraft interior configuration in accordance with the present invention is designed to accommodate one, two, or more patients on stretchers or litters with a minimum of one pilot and one medical attendant. It is the intent of the present invention to provide an interior which readily accommodates the transportation of two or more patients while functioning equally as well with one patient.

Figure 1:
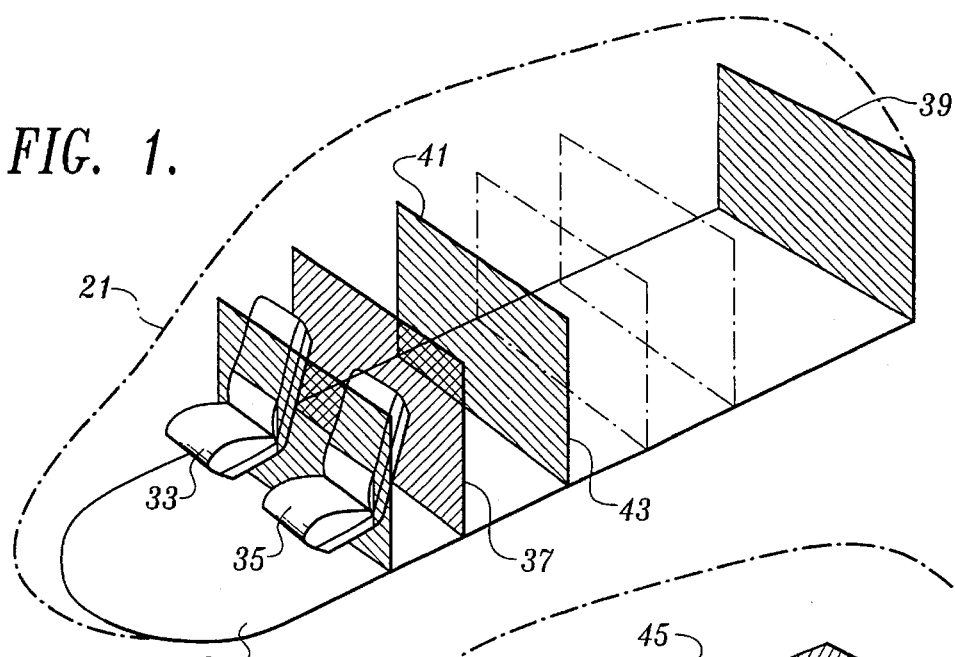
FIG. 1 is a diagrammatic, top perspective of an aircraft illustrating first preferred locations for patient support equipment of a patient transport system in accordance with the present invention.

The aircraft 21 shown in FIG. 1 has a floor 31, right pilot seat 33, and left pilot seat 35. The location of pilot seats 33 and 35 on aircraft floor 31 is defined by a substantially vertical transverse plane 37, but the position of the pilot seats 33 and 35 can be adjusted both laterally and longitudinally, positioning them fore or aft of the plane 37 in order to adapt the aircraft for use of the novel interior configuration in accordance with the present invention. Plane 37, and the other planes identified below, are reference planes for the purpose of defining features of the improved interior configuration. For some aircraft it may be necessary to remove one of the pilot seats to accommodate the improved interior configuration.

At the rear of the aircraft is a second substantially vertical transverse plane 39, defining a rearwardmost position of a first stretcher or patient litter positioned in the aircraft cabin. Plane 39 usually coincides with the rear bulkhead of the cabin. However, in some aircraft, plane 39 would define the rearwardmost position of a patient litter extending into what could be considered the rear tail cone section of the aircraft.

Forward of plane 39 is a third substantially vertical transverse plane 41 defining the forwardmost position of the first litter positioned in the interior of the preferred aircraft configured in accordance with the present invention.

A fourth substantially vertical transverse plane 43 defines the forwardmost position of a second stretcher or patient litter. While vertical plane 41 and vertical plane 43 could conceivably be the same plane, in the preferred embodiment of the present invention the forwardmost position of the second litter is shifted forward of the forwardmost position of the first litter. For most applications, the patients are loaded with their heads toward the front and with staggered longitudinal and vertical positioning to permit convenient access to the heads and upper bodies of both patients in a narrow body aircraft, without having one litter overlying the head end portion of the other litter, thereby restricting access to one of the patients.

In addition, while vertical plane 37 and vertical plane 43 could conceivably be the same plane, the preferred embodiment of the present invention positions the forwardmost position of the second litter aft of plane 37. In many aircraft, plane 43 would coincide with a bulkhead behind the pilot seat or seats.

Figure 2:
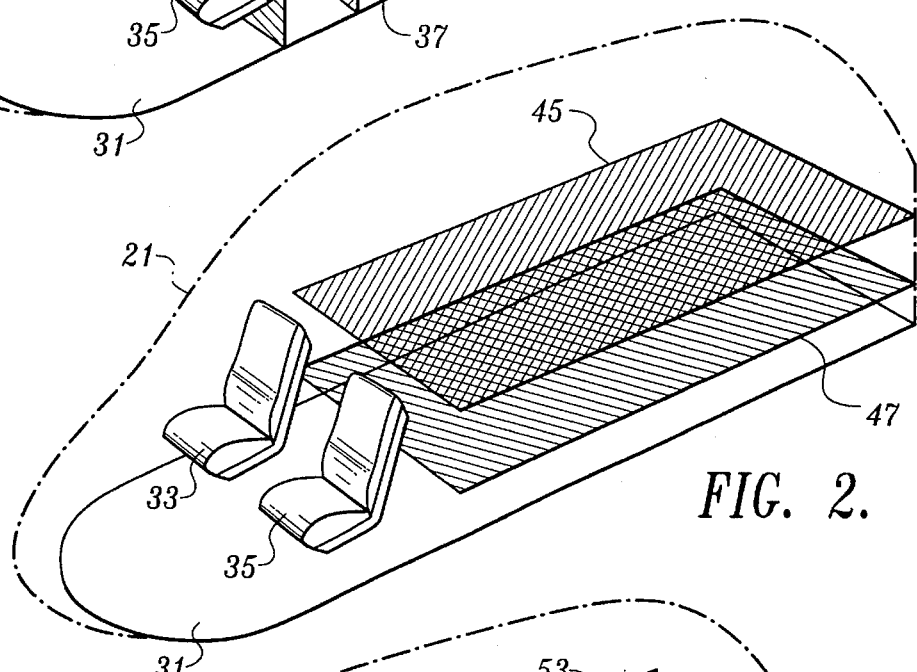
FIG. 2 is a diagrammatic, top perspective of an aircraft illustrating second preferred locations for patient support equipment of a patient transport system in accordance with the present invention.

While the vertical transverse planes shown in FIG. 1 illustrate the longitudinally adjusted positions of stretchers or patient litters, FIG. 2 shows the different vertical positions for stretchers or patient litters in the preferred configuration of the present invention. The aircraft floor 31 defines a first substantially horizontal plane which serves as the reference or base point. A second substantially horizontal plane 45, spaced above floor 31, defines an upper position of the first stretcher or patient litter.

A third substantially horizontal plane 47, between the floor 31 and the second horizontal plane 45, defines a lower position for a second stretcher or litter. While the floor of the aircraft 31 and the third horizontal plane 47 could conceivably be the same plane, in the preferred embodiment of the present invention the lowermost patient is positioned above the aircraft floor 31. This is a function of placing an apparatus to hold the stretcher or patient litter securely on the aircraft floor 31, and a device for moving the patient in three dimensions within the aircraft interior (laterally, longitudinally, and vertically), and also permits more convenient access to the patient by an attendant. In the preferred embodiment of the present invention, if two patients are being carried in the interior of the aircraft, horizontal planes 45 and 47 will be separated sufficiently to space the two patients such that both patients are readily accessible by the medical attendant(s).

Because ceiling heights vary from aircraft to aircraft compatible with the present invention, the positions of substantially horizontal planes 45 and 47 with respect to cabin floor 31 can be adjusted to provide the most efficient use of the interior space of the cabin. As represented by the vertical planes shown in FIG. 1, the two stretchers or patient litters are staggered longitudinally. Preferably, the head end portion of the lower patient is substantially forward of the forwardmost position of the upper patient, so that the medical attendant(s) have the desired access to each patient.

Figure 3:
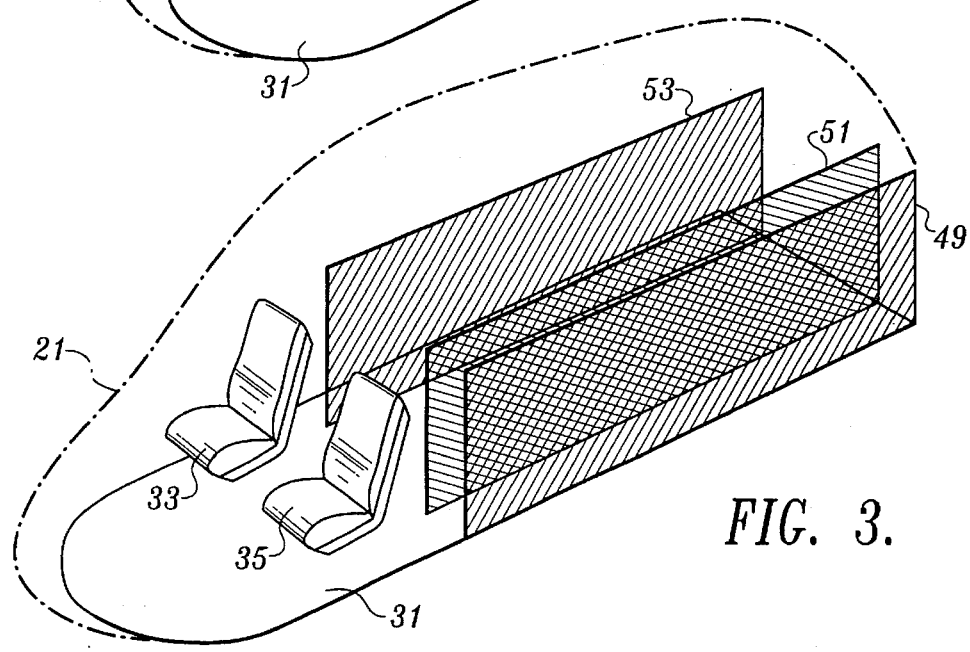
FIG. 3 is a diagrammatic, top perspective of an aircraft illustrating third preferred locations for patient support equipment of a patient transport system in accordance with the present invention.

FIG. 3 illustrates three substantially vertical longitudinal planes 49, 51, and 53 spaced apart transversely of the aircraft and further defining the location of the stretchers or patient litters as well as the medical attendants. Vertical plane 49 defines the leftmost position of the second (lower) stretcher or patient litter which is below and offset forward from the first stretcher or patient litter in the preferred embodiment of the present invention. While vertical plane 49 and the left side of the aircraft cabin wall could coincide, in the preferred embodiment the leftmost position of the second stretcher or patient litter is positioned slightly to the inside of the left aircraft cabin wall. Generally, considering the litter and the necessary mechanical devices to support and securely hold the litter and patient in position, the preferred embodiment of the present invention allows some room between the leftmost position of the second litter and the left aircraft cabin wall, although it is generally considered beneficial to minimize this space as much as possible.

The leftmost position of the first (upper) litter is defined by a substantially vertical longitudinal plane 51. While vertical planes 51 and 49 could coincide, the preferred embodiment of the present invention assumes that the left side of the aircraft cabin wall will have a curvature preventing the first litter from being placed directly above the second litter; this is assuming the second litter is positioned as close as possible to the left cabin wall. Finally, substantially vertical longitudinal plane 53, offset to the right of planes 49 and 51, defines the location where the medical attendants are preferably positioned.

The interior configuration described herein can be adjusted for different aircraft depending on accessibility to the aircraft interior through exterior doors, and the arrangement of the aircraft cabin. The patients could be located on the right side of the cabin, in which case the medical attendants would be located on the left side of the aircraft cabin, or vice versa. For purposes of further describing the present invention, the patients are loaded through the right side of the aircraft and are positioned adjacent to the left side of the aircraft; the medical attendants are positioned toward the right side of the aircraft. This configuration corresponds to the layout of the cabin and exterior doors of a Bell 222/230 helicopter. In this regard, the preferred positioning of the patients will be on the left side of the aircraft, the first patient being positioned substantially above, to the rear, and to the right of the second patient. The patients are loaded feet toward the rear of the aircraft so that the medical attendants have unrestricted access to the head and chest of each patient. The medical attendants of the present invention are located on the right side of the aircraft and can move substantially from the forward bulkhead represented by horizontal plane 37 to the rear cabin bulkhead represented by vertical plane 39.

Figure 4:
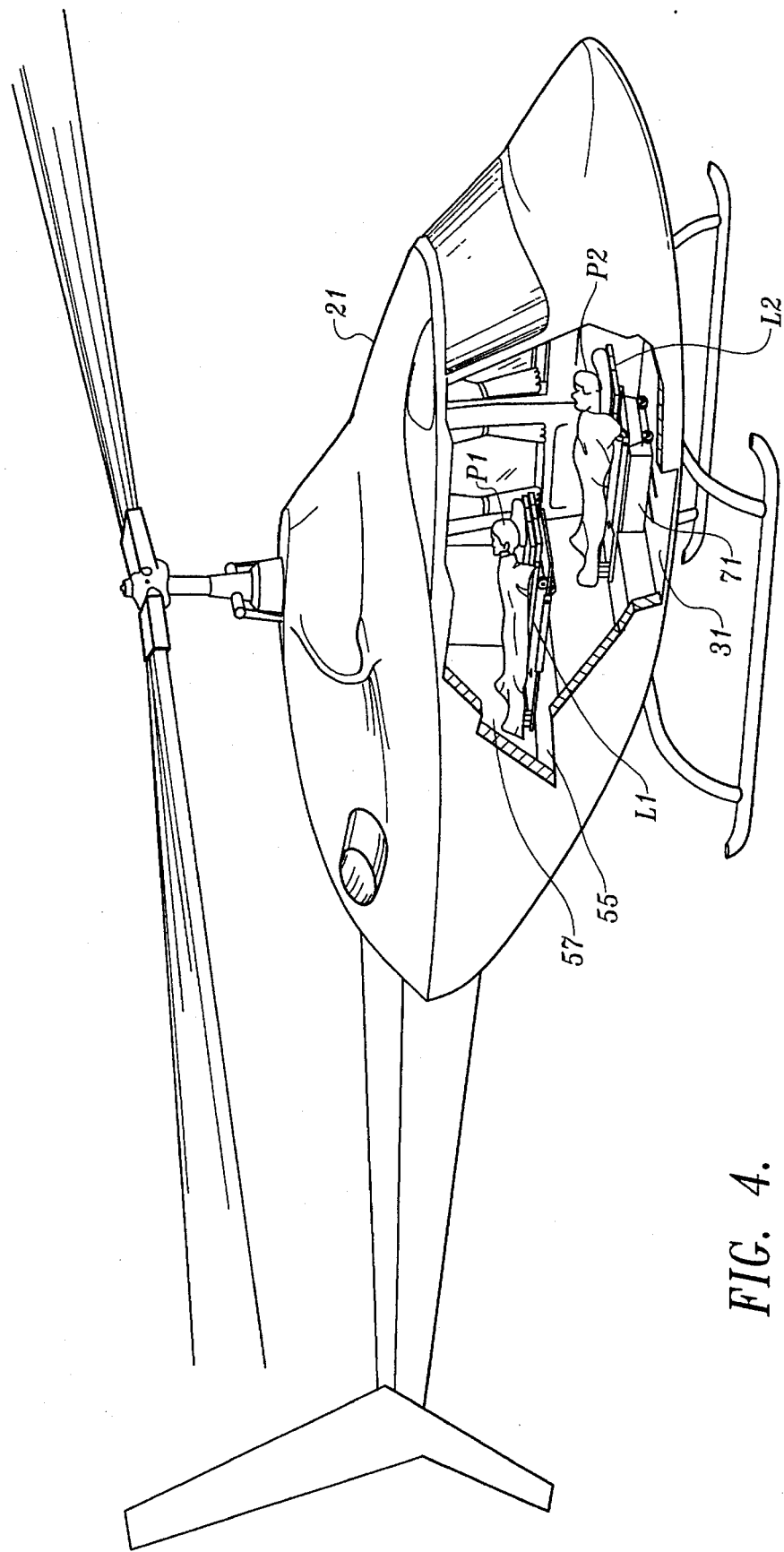
FIG. 4 is a top right perspective of an aircraft having a patient transport system in accordance with the present invention, with parts broken away.

FIG. 4 illustrates the preferred positioning of two patients as they would appear in a helicopter 21 having its cabin modified in accordance with the present invention. A first patient P1 is supported on the rear deck 55 which is positioned substantially above the aircraft floor 31 and higher than the second patient P2. Patient P1 is offset toward the left of the aircraft for access by a medical attendant riding on the right, but not so far to the left as the lower patient P2. The rearwardmost position of patient P1 positions the foot of the patient stretcher or litter L1 close to the rear bulkhead 57 of the aircraft cabin. The head of litter L2 for the second patient P2 is positioned substantially forward of the head of litter L1, but still substantially to the rear of the pilot seat or seats. Litter L2 is supported above the floor 31 for convenient access by the medical attendant or attendants and to allow positioning of a carriage and lifting assembly 71 between the second litter L2 and the cabin floor 31.

Figure 5:
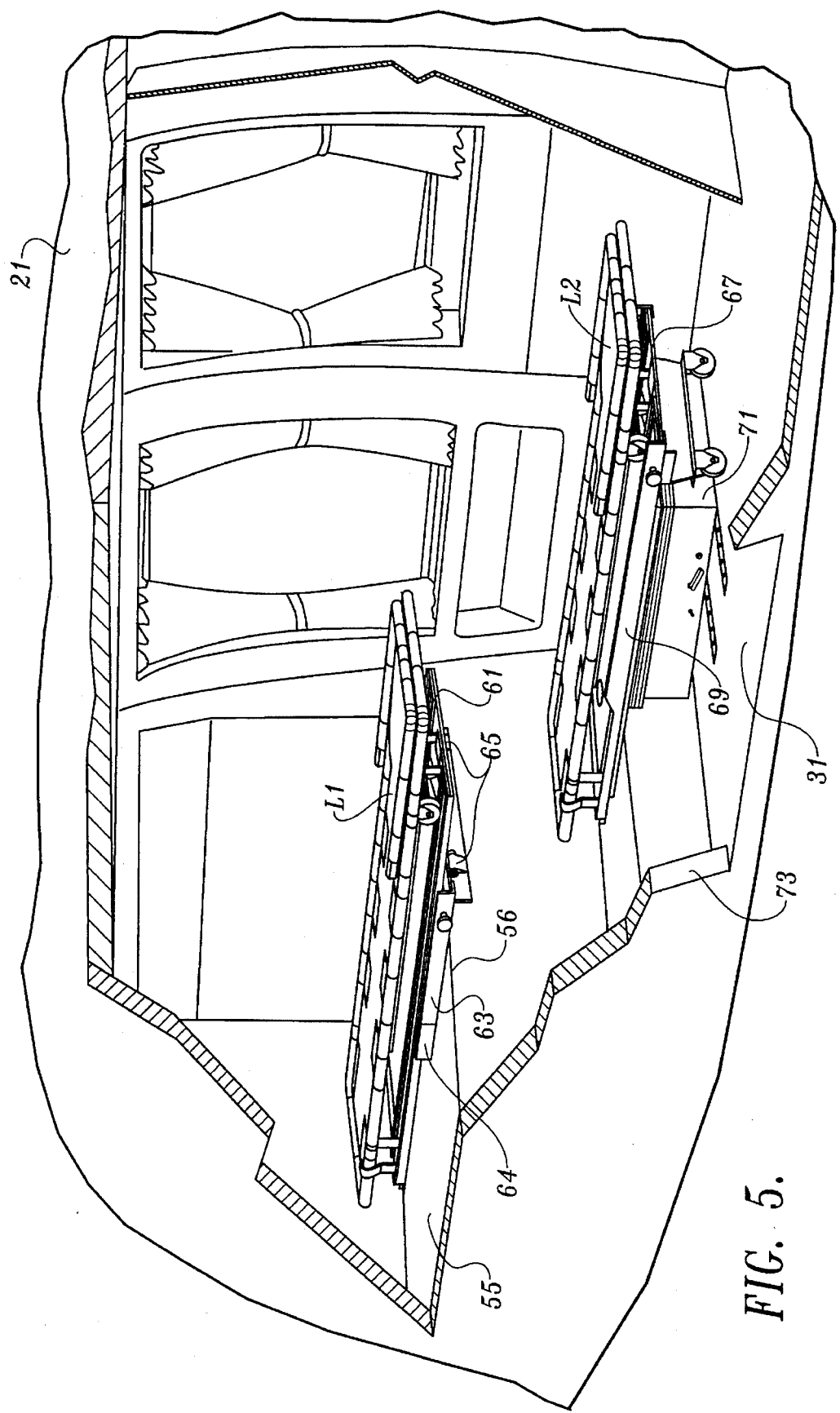
FIG. 5 is an enlarged top right perspective of the cabin of the aircraft of FIG. 4 with parts broken away.

With reference to FIG. 5, the upper stretcher or litter L1 is supported on an upper tray 61 which, in turn, is detachably mounted in a bedplate assembly 63, 64. Tray 61 includes mechanism for locking the litter L1 in position on the tray. Similarly, bedplate assembly 63, 64 includes mechanism for locking the tray in such assembly. In addition, the forward portion or plate 63 of the bedplate assembly is pivotally mounted on the upper rear deck portion 55 by hinges 65 for swinging about a horizontal axis extending transversely of the aircraft. Such axis is approximately aligned with the corner 56 at the leading edge of the rear deck. The rear portion or plate 64 is a channel iron permanently secured to the rear deck 55.

The lower litter L2 is supported on and locked to a lower tray 67. Tray 67 is supported on the carriage and lift assembly 71. The carriage and lift assembly allows the vertical position of the lower tray 67 and litter L2 to be adjusted, even when carrying a patient. The carriage and lift assembly also is movable transversely of the aircraft. Further, the lower tray is swingable relative to the carriage and lift assembly about a vertical axis located toward the foot end of the tray and litter L2. For example, FIG. 5 illustrates the lowered and leftmost shifted position of the lift carriage, as well as the longitudinally extending position of the lower tray. From such longitudinally extending position, the head end portion of the lower tray can be swung to the right, toward the exterior door opening 73 of the aircraft.

The final positioning of the patient litters L1 and L2 illustrated in FIGS. 4 and 5 provides convenient access to the patients by a medical attendant or attendants. In addition, the interconnection of the litter supporting trays with the upper bedplate and the lower lift carriage permits quick, convenient, and safe loading of a plurality of patients into the aircraft. The sequence of loading two patients is illustrated diagrammatically in FIGS. 6–11, in which some parts are deleted and, in general, parts are shown diagrammatically for ease in understanding the patient loading procedure. Also, in several views the patients and the litters on which they are supported are not illustrated so that the underlying components in accordance with the present invention can be seen.

Figure 6:
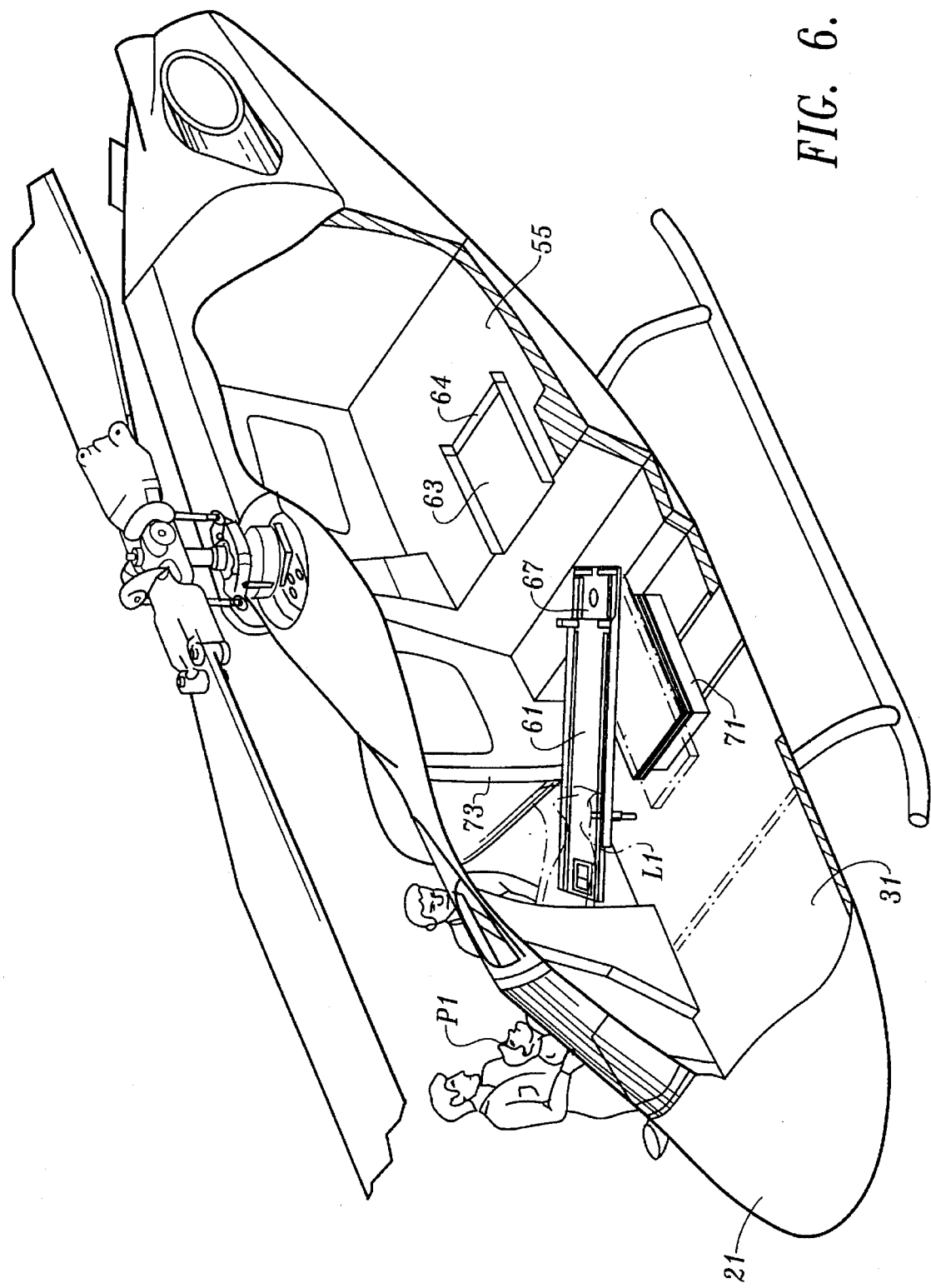
FIG. 6 is a diagrammatic top left perspective of the aircraft of FIG. 4 with parts broken away and parts in different positions, illustrating the beginning of the procedure of loading a patient in the transport system of the present invention.

With reference to FIG. 6, initially the upper tray 61 is fitted within the lower tray 67, and the upper bedplate assembly 63, 64 is empty. There is a limited sliding fit of the upper tray in the lower tray such that, with the lift carriage 71 shifted toward the center of the aircraft and with the lower tray 67 pivoted outward toward the exterior door opening 73, the upper tray can be telescoped outward, preferably part way through the exterior door opening. It is not necessary to shift the lift carriage 71 toward the center of the aircraft; however, this feature enhances loading and unloading patients. The first patient P1 supported on the standard stretcher or patient litter L1 (such as a Ferno #9 litter) is loaded onto the upper tray. Litter L1 is slid rearward onto tray 61, foot end first, until the litter is fully supported on the tray. Then the litter is locked in position (the locking mechanism is described in detail below).

Figure 7:
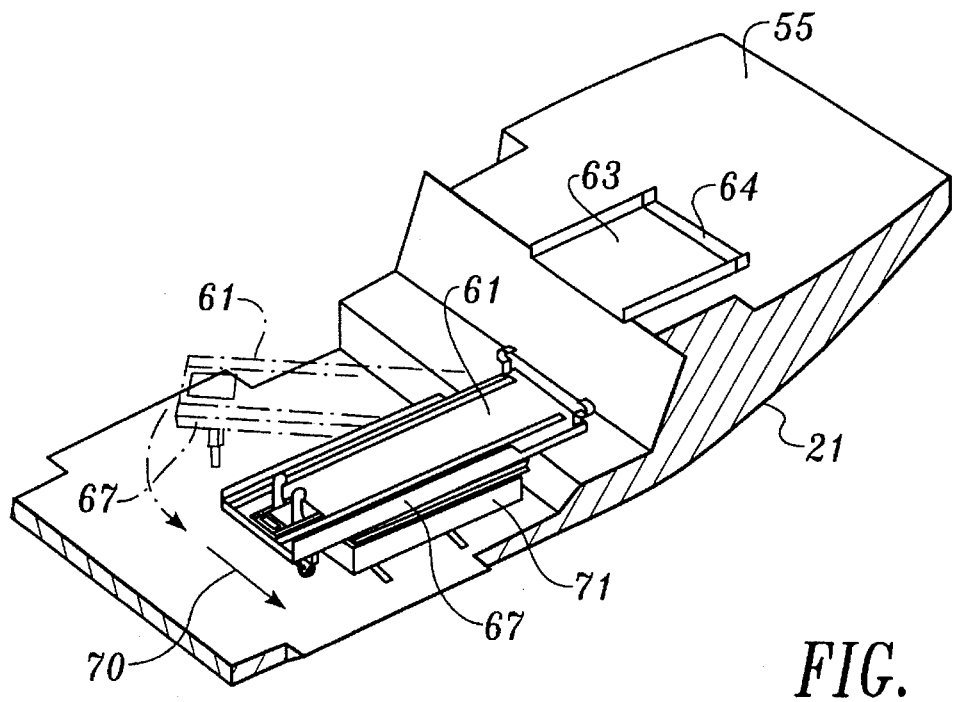
FIG. 7 is a top left perspective illustrating diagrammatically a first additional step in the procedure of loading a patient in the patient transport system of the present invention.
Figure 8:
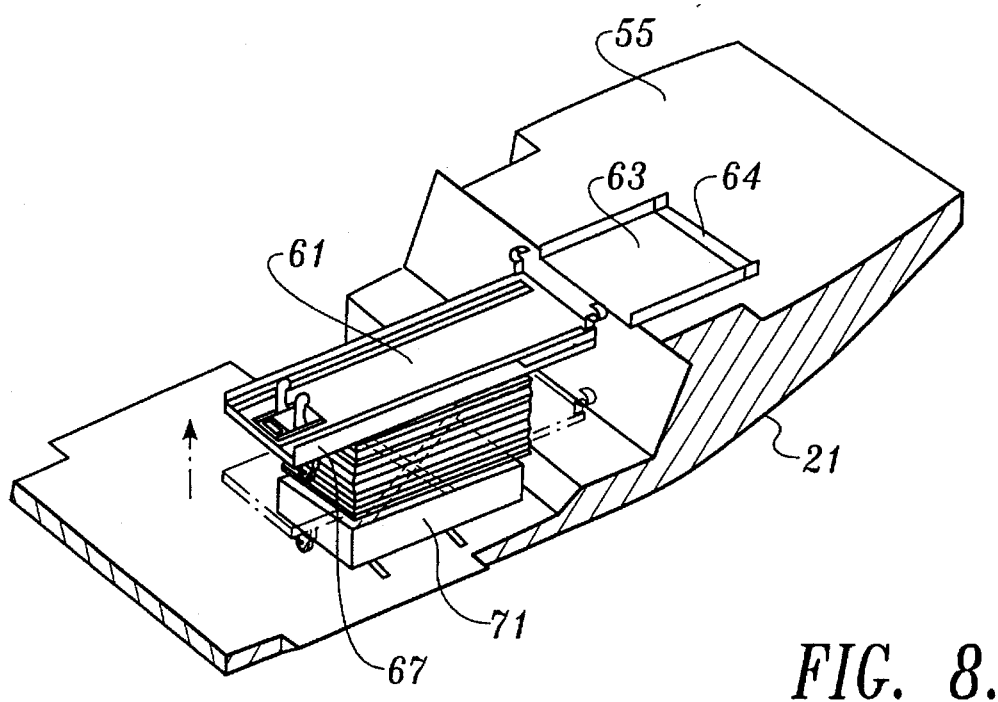
FIG. 8 is a top left perspective illustrating diagrammatically a second additional step in the procedure of loading a patient in the patient transport system of the present invention.

With reference to FIG. 7, the next step is to telescope the upper tray 61 back along the lower tray 67 so that the two trays are substantially registered in the position shown in broken lines in FIG. 7. From such position the lower tray can be swung inward, back over the lift carriage 71 to the solid line position shown in FIG. 7. The telescoping action of the upper tray over the lower tray provides more convenient access for loading the patient through the exterior door, while permitting the lower tray to remain in the retracted position, so that once the upper tray is locked into the retracted position on the lower tray, both trays can be swung past the frame of the door opening 73, inward to the solid line, longitudinally extending position. The lift carriage 71 and the trays and patient litter supported thereby are shifted to the left of the aircraft, as indicated by the arrow 70, which can be done either before or after swinging the lower tray to the longitudinally extending position.

Figure 9:
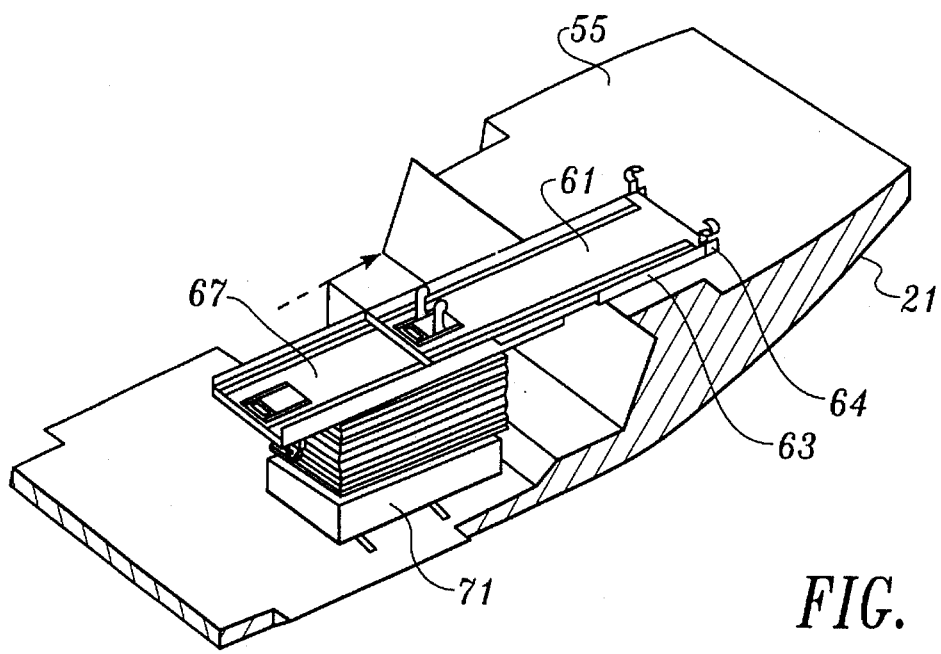
FIG. 9 is a top left perspective illustrating diagrammatically a third additional step in the procedure of loading a patient in the patient transport system of the present invention.

If only a single patient is to be transported, no additional steps are required to load and secure the patient in the aircraft. However, if a plurality of patients are to be transported, the lift carriage is actuated to raise the lower tray 67, as well as the upper tray 61 and the patient litter (and patient) supported thereby, to the position illustrated in FIG. 8. In the raised condition of the lift carriage illustrated in FIG. 8 and FIG. 9, the upper tray 61 is at approximately the same height as the bedplate assembly 63, 64 supported on the rear ledge or deck 55 of the aircraft cabin. The upper tray is released from the lower tray such that it may be slid rearward into the bedplate assembly, as illustrated in FIG. 9. In the rearwardmost shifted position of the upper tray 61, its foot end projects beyond the rear plate 64, and a short section of the head end portion of the upper tray projects forward from the front plate 63 so as to overhang from the deck 55. The rearwardmost shifted position of the upper tray 61 is illustrated in solid lines in FIG. 10.

Figure 10:
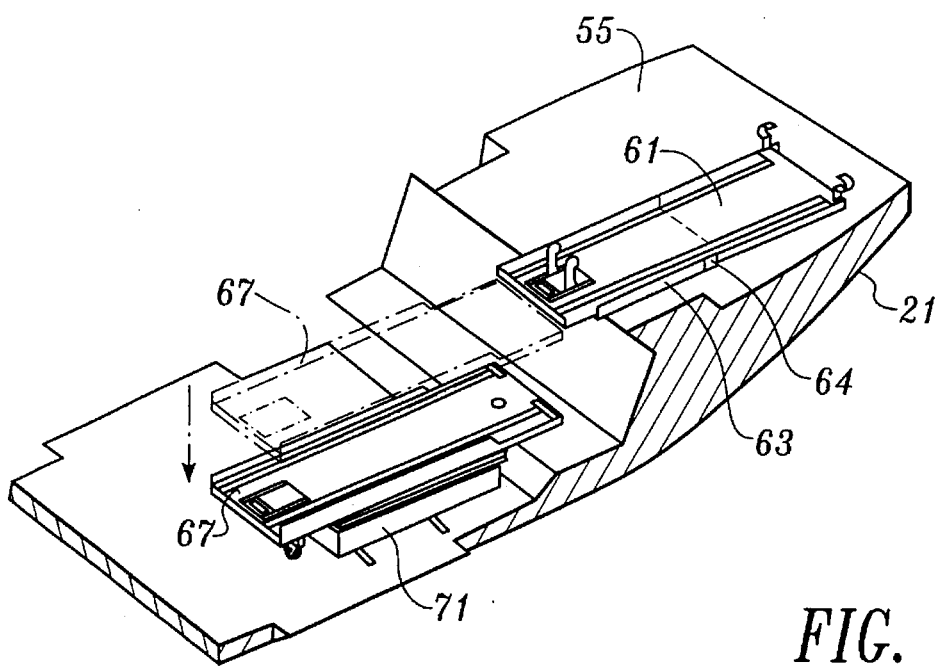
FIG. 10 is a top left perspective illustrating diagrammatically a fourth additional step in the procedure of loading a patient in the patient transport system of the present invention.
Figure 11:
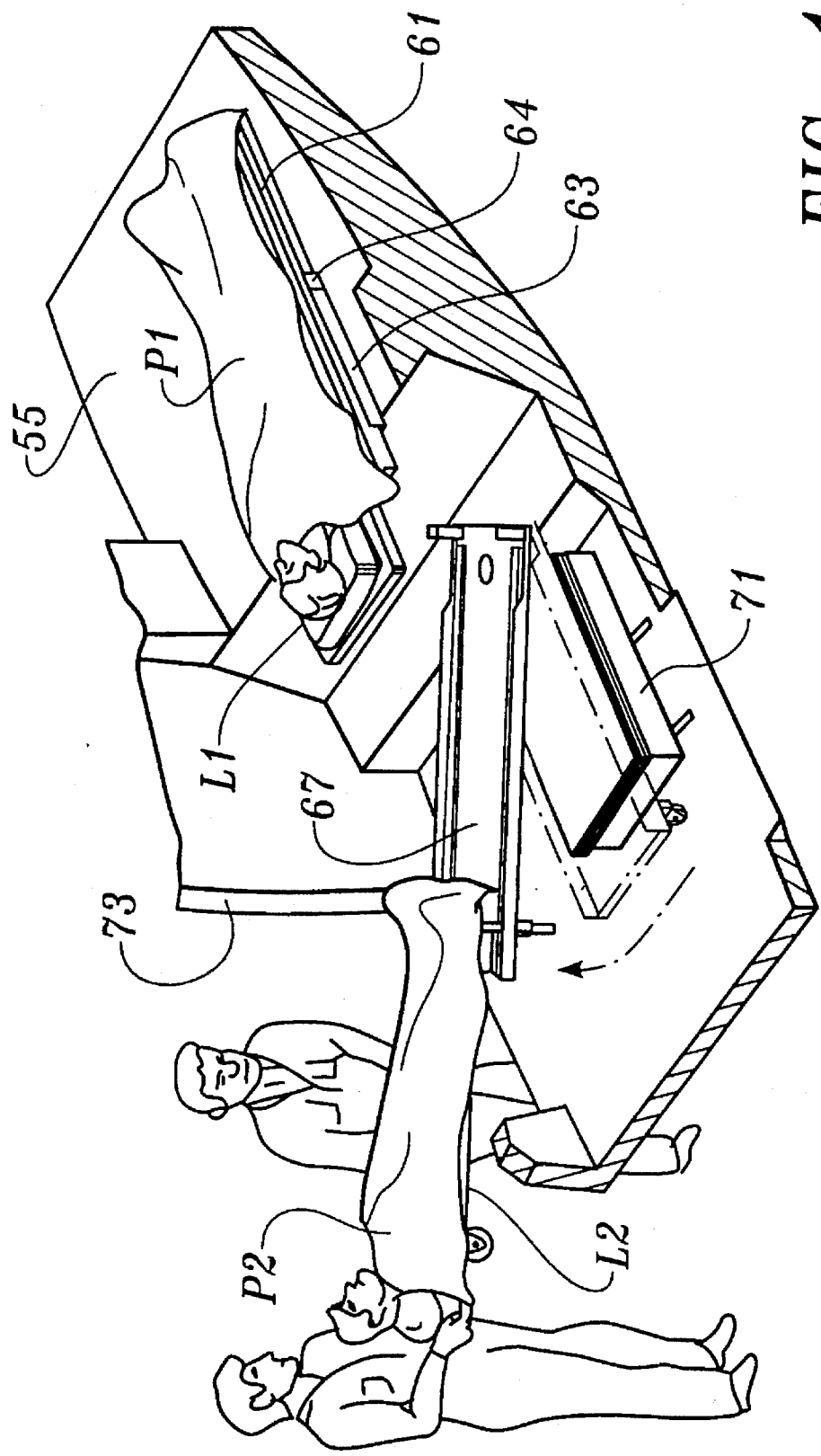
FIG. 11 is a top left perspective illustrating diagrammatically a fifth additional step in the procedure of loading a patient in the patient transport system of the present invention.

As also illustrated in FIG. 10, the lift carriage 71 is then collapsed such that the lower tray 67 moves from the upper, broken line position to the lowered, solid line position. Then, the head end portion of the lower tray 67 is swung outward to the oblique position shown in FIG. 11, toward the exterior door opening 73. A second patient P2 supported on a litter L2 is loaded onto the lower tray 67 which now is exposed. If desired, the lift carriage 71 can be shifted transversely toward the center of the aircraft to position the foot of the lower tray nearer to the door opening. Once the second patient litter L2 has been fitted onto the lower tray 67, the litter is locked to the tray, and the tray is swung inward to the longitudinally extending position shown in broken lines in FIG. 11. If the lift carriage previously was shifted transversely toward the door, it is shifted back to the leftmost position to provide more room for an attendant or attendants at the right side of the aircraft. Both patients, particularly their heads and chests, are readily accessible to the attendant(s) during transportation to the destination facility. At such facility, the sequence of unloading of the patients is the reverse of the loading procedure described above.

Figure 12:
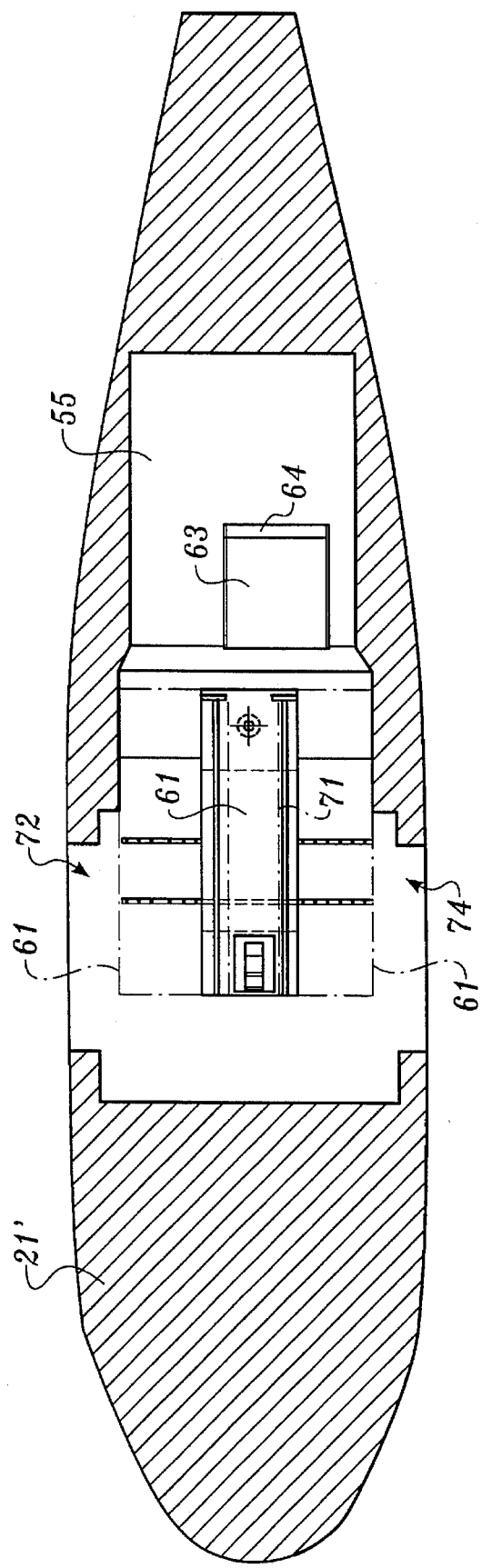
FIG. 12 is a diagrammatic top plan of an aircraft having a first alternative form of a patient transport system in accordance with the present invention.

With reference to FIG. 12, some aircraft may have, or be modified to have, exterior door openings in both sides of the aircraft. Aircraft 21' shown in FIG. 12 has a first exterior door opening 72 in the right side of the aircraft and a second exterior door opening 74 in the left side of the aircraft. In that case, it is desirable for the lift carriage 71 to have a wider range of travel transversely of the aircraft, such as from a position closely adjacent to the right side to a position closely adjacent to the left side. Preferably, the bedplate assembly 63, 64 still is located on a high rear ledge or deck and is offset toward one side of the aircraft so that an attendant has convenient access from the other side.

Figure 13:
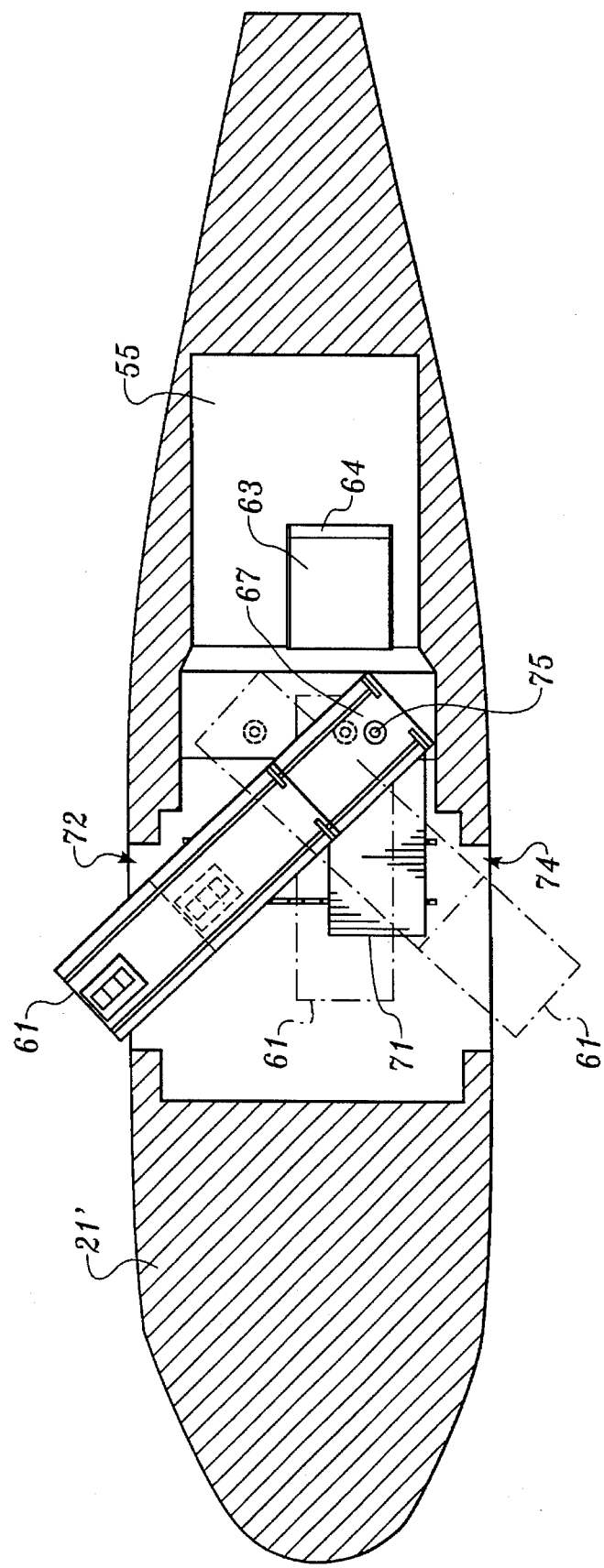
FIG. 13 is a diagrammatic top plan of an aircraft having a second alternative form of a patient transport system in accordance with the present invention.

Depending on the longitudinal positions of the exterior door openings, the lift carriage 71 may be shifted either toward or away from the opening 72 or 74 through which a patient or patients are to be loaded. For example, FIG. 13 illustrates a configuration in which the exterior door openings 72 and 74 are disposed forward of the pivot 75 for the lower tray 67. In that case, the lift carriage may be shifted to the left of the aircraft, as illustrated in solid lines, to allow the lower tray 67 to be swung toward the right opening 72 for more convenient loading of a patient than if the lift carriage were positioned at the center of the aircraft or were shifted to the right. If the patient were to be loaded through the left door opening 74, the lift carriage 71 would be shifted to the right such that the lower tray 67 could be swung to the broken line position shown in FIG. 13.

If the exterior door openings were located more toward the rear, and/or the cabin layout permitted the pivot 75 to be located at a more forward position, the trailing upright frame pieces of the door openings would not interfere with swinging of the lower tray relative to the lift carriage. In that case the lift carriage could be stably positioned at the center of the aircraft during loading of a patient, or could even be shifted toward the door through which the patient is to be loaded. In either arrangement, however, if multiple patients are to be transported, the lift carriage 71 must be shifted into alignment with the upper bedplate assembly 63, 64 prior to extending the lift carriage and shifting the upper tray 61 from the lower tray 67 to the bedplates.

Figure 14:
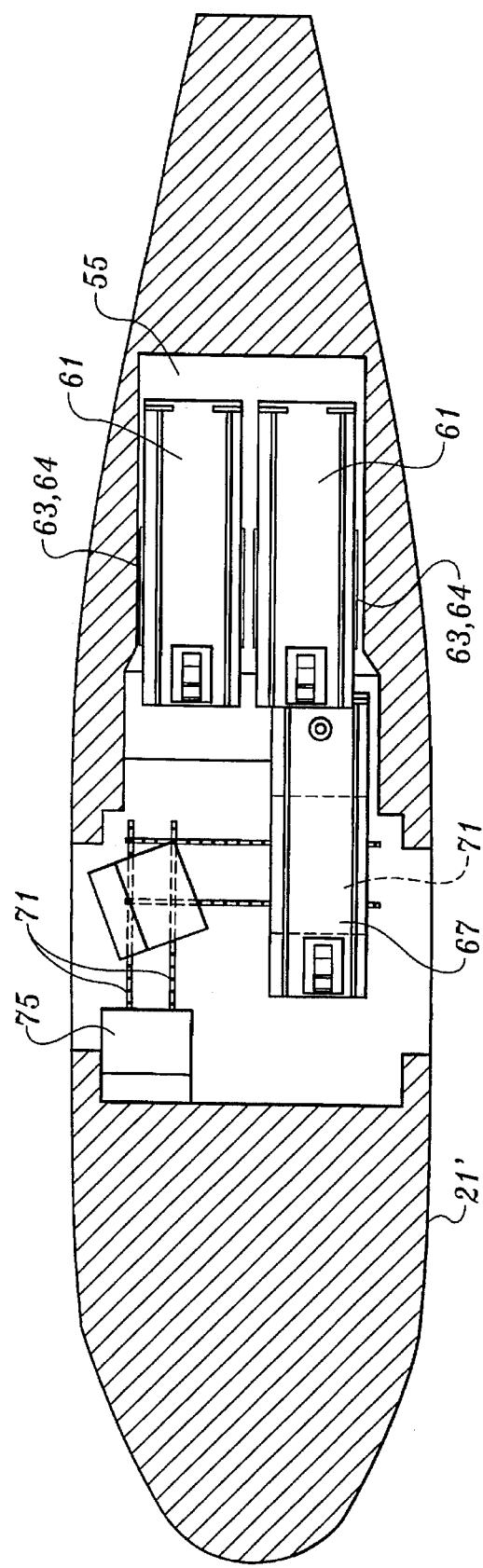
FIG. 14 is a diagrammatic top plan of an aircraft having another alternative form of a patient transport system in accordance with the present invention.

With reference to FIG. 14, another alternative is to provide side-by-side bedplate assemblies 63, 64 on the rear ledge or deck 55. Prior to loading the first patient, one of the two identical upper trays 61 would be transferred onto the single lower tray 67 supported on the lift carriage 71, such that the litter carrying the first patient could be loaded through one or the other of the exterior door openings 72 and 74. After transfer of the first upper tray onto its bedplate, the second upper tray 67 would be loaded onto the lower tray 67 and positioned for loading of a second patient. Thereafter, following transfer of the second upper tray to its bedplate, a third patient could be loaded onto the lower tray.

Another modification illustrated in FIG. 14 is the provision of a seat 75 for an attendant mounted on aircraft seat tracks so as to allow the attendant's seat to be moved to a forward position in which it will not interfere with loading of the patient(s) to a rearward shifted position more closely adjacent to the patient(s). This seat may be entirely removable to facilitate loading and unloading patients, wherein the seat is installed after all patients have been loaded or removed prior to removing patients.

Figure 15:
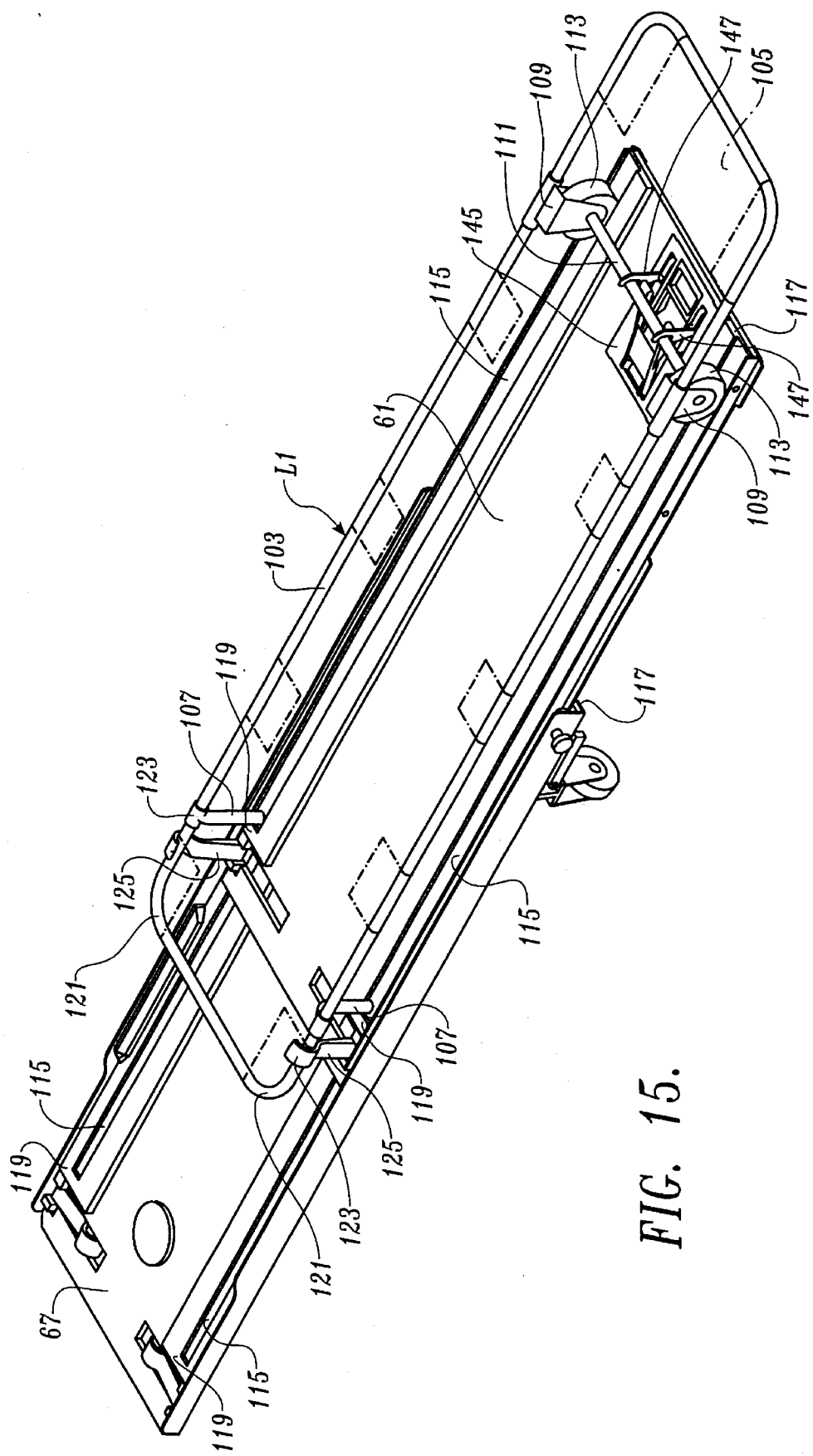
FIG. 15 is a top right perspective of components of a patient transport system in accordance with the present invention, namely, an upper tray fitted within a lower tray and having mechanism for securing a patient litter thereon.

With reference to FIG. 15, prior to transport within a vehicle, such as a helicopter, the standard stretcher or patient litter L1 must be secured on its respective tray 61 or 67. The standard litter L1 includes a generally rectangular, peripheral frame 103 draped with a sheet 105 of canvas or similar material under tension on which the patient lies. Support posts 107 extend downward near the foot end of the frame 103 on the right and left sides. Wheel brackets 109 extend downward near the head end on both sides of the frame. The axle 111 on which the wheels 113 are journaled extends crosswise between brackets 109.

Trays 61 and 67 have identical components for releasably locking the standard litter in position. Each tray includes a pair of shallow grooves or tracks 115 along its opposite longitudinal sides. Tracks 115 are open at the head ends 117 of the trays such that the posts 107 can be easily inserted into the tracks when the foot end of the litter is first loaded onto the head end of a tray. Thereafter, the litter can be slid rearward with the tracks guiding rearward sliding movement of the posts. The raised edge portions of the tracks limit transverse movement of the posts. The tracks end near the foot end of the tray where raised stops 119 prevent further rearward sliding movement. In the rearwardmost position of the litter on the tray, posts 107 are engaged against stops 119, and wheels 113 are supported in the tracks 115 at the head end portion of the tray.

As the litter approaches its rearward position on the tray 61 or 67, the corners 121 of the litter frame 103 fit beneath inwardly curved upper end portions 123 of upright retainers 125. Such retainers are positioned at opposite sides of the foot end portion of each tray, adjacent to the raised stops 119. The details of the mounting of the upright retainers 125 are shown in FIGS. 16 and 17. Preferably each retainer is pivotally mounted on its tray for swinging between a vertical litter-restraining position (shown in broken lines in FIG. 16) and an inwardly swung horizontal position (shown in solid lines) in which the retainer is received in a recess 127 in the upper surface of the tray. The recesses allow the retainers to be folded down sufficiently that they do not interfere with other components or catch on other objects. This is desirable, for example, with the retainers on the lower tray when the upper tray is slid over the lower tray.

As seen in FIG. 17, in the preferred embodiment the base portion 129 of each retainer 125 is fitted between short pivot blocks 131 and 133 mounted forward and rearward, respectively, of the retainers. A pivot pin 135 has its opposite ends received in the pivot blocks and extends through the base 129 of the retainer 125 to achieve the desired pivotal mounting In the raised, upright position of the retainer, illustrated in broken lines in FIG. 16, the outer side of the retainer engages against an upstanding flange 137 along the adjacent side of the tray. Such flange also defines the outer edge of the longitudinally extending tray groove or track 115. As seen in FIG. 17, a notch 139 can be provided in the forward side of the retainer 125, close to its base, for receiving the tip of a spring-loaded detent 141 carried in a horizontal bore 143 of the forward pivot block 131. Preferably notch 139 is positioned to receive the detent when the retainer is in its upright position. When the retainer is folded downward and inward, the detent engages over the top of the retainer to releasably maintain the retainer horizontal. As seen in FIG. 16, the hooked end 123 of the retainer projects sufficiently from the tray recess 127 to provide a fingerhold for swinging the retainer from the horizontal position to the vertical position against the action of the spring-loaded detent.

With reference to FIG. 15, the retainers 125 in their upright positions snugly receive the foot end portion of the litter frame 103 at its opposite sides and prevent substantial vertical, transverse, or twisting motion of the litter relative to the tray. At the head end of each tray, an axle lock assembly 145 is provided including hooks 147 movable to a position for grasping the axle 111 to prevent substantial forward or upward shifting of the head end portion of the litter. Since rearward movement of the litter is prevented by engagement of the posts 107 against the stops 119, and vertical movement of the foot end of the litter is prevented by the inwardly curved ends 123 of retainers 125 hooked over the litter frame, and transverse movement of the litter is prevented at the foot end by the retainers 125 in combination with the posts 107 fitted in the tracks 115 and, at the head end of the tray, by wheels 113 snugly received in the tracks 115, the axle lock 145 is the final component required to reliably secure the litter L to the tray.

Figure 18:
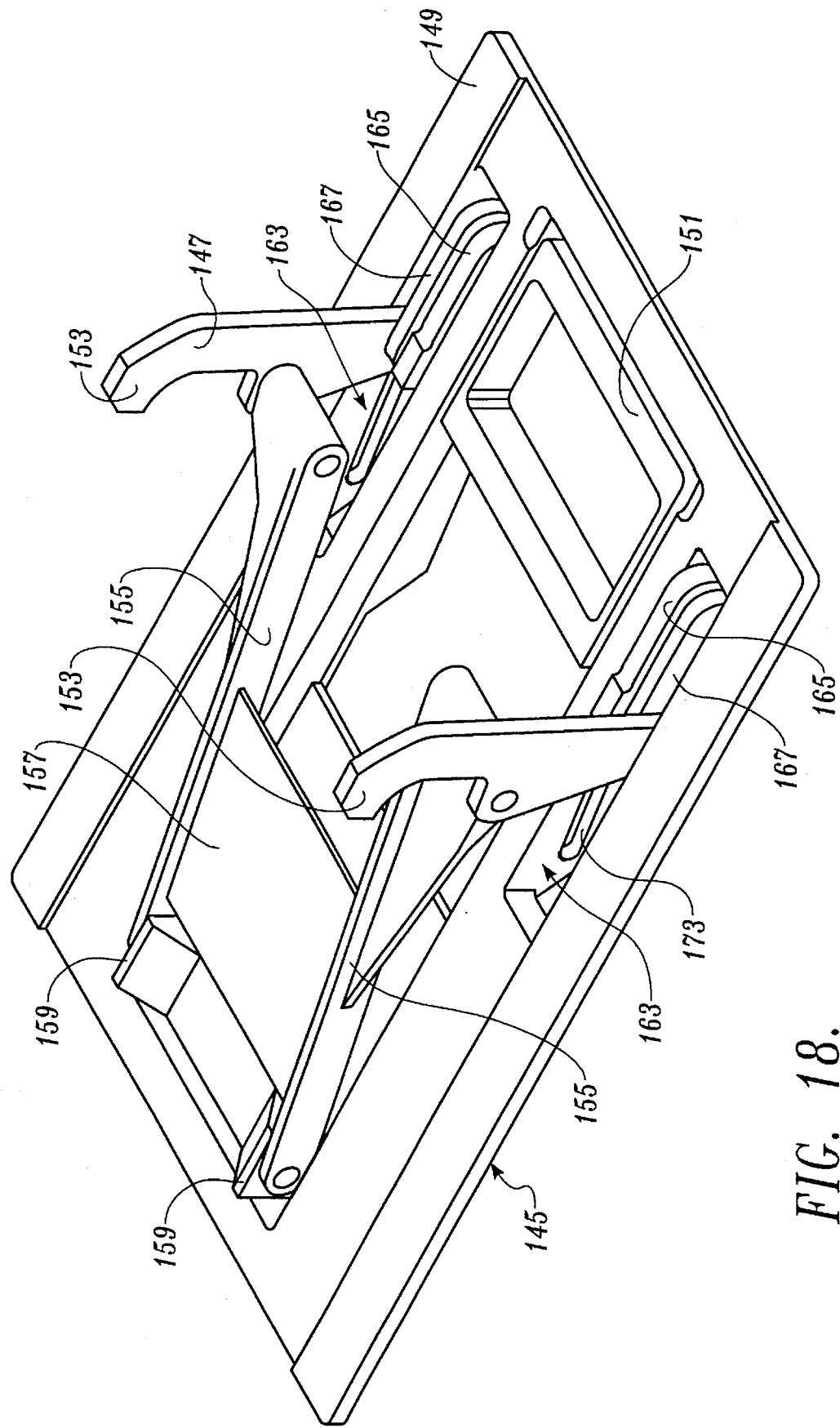
FIG. 18 is a top right perspective of another component of the litter securing mechanism of FIG. 15, namely, an axle locking assembly.

Referring to FIG. 18, axle lock 145 includes a generally rectangular frame plate 149, the swingable hooks 147, a handle 151 pivotally mounted in the frame plate, and a linkage assembly connecting those components. The frame plate is mounted in a recess in the top of its respective tray in the area below the litter axle when the litter is approximately centered over the tray. By manipulation of the handle 151, hooks 147 are swung between an upright position in which the rearwardly curved upper ends 153 of the hooks are fitted over the axle and a horizontal position in which the hooks are retracted into the frame plate 149. The hooks rotate through an angle of approximately 90° between the upright locking position and the horizontal retracted position.

The linkage assembly by which the hooks, frame plate, and handle are interconnected includes a pair of generally horizontal arms 155 joined by a transversely extending cross plate 157. The rear ends of the arms project from the cross plate and are pivoted to upright posts 159 formed integrally with or secured to the frame plate 149. The front ends of the arms are pivoted to the central portions of the hooks 147 approximately midway between the top curved end portions 153 and the bottom portions of the hooks.

Figure 19:
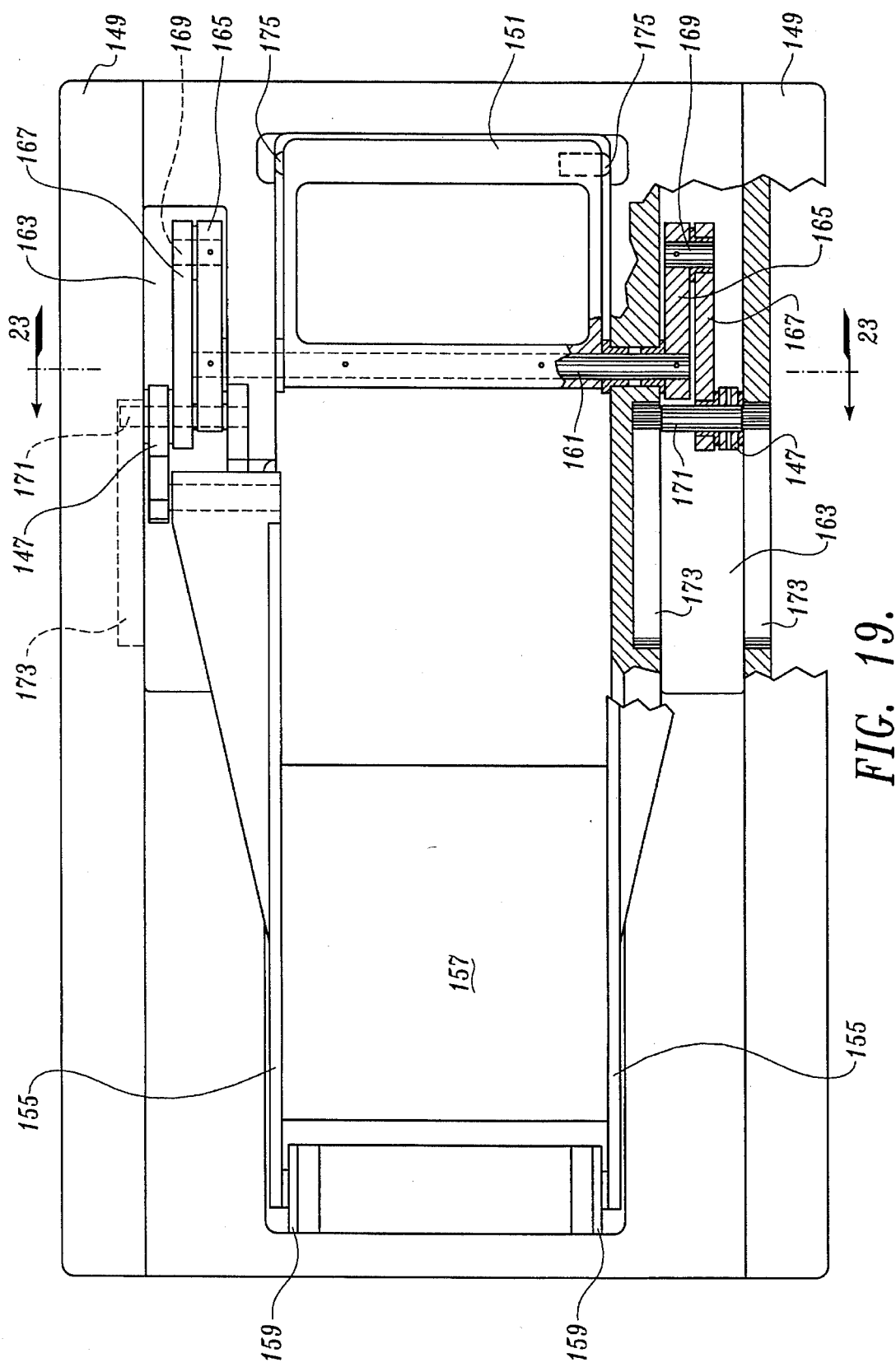
FIG. 19 is a top plan of the axle locking assembly of FIG. 18 with parts broken away.
Figure 20:
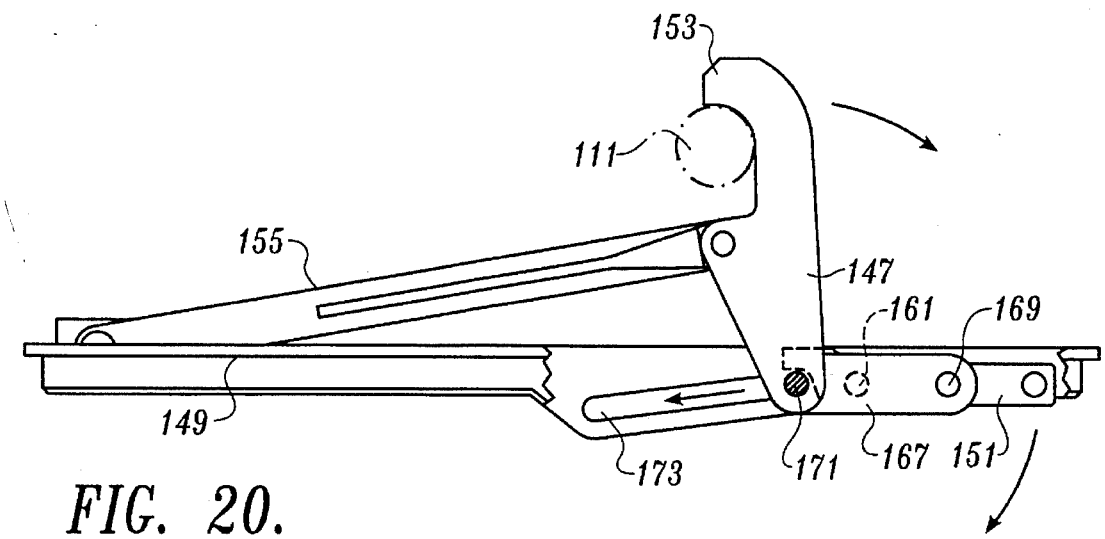
FIG. 20 is a first diagrammatic side elevation illustrating operation of the axle locking assembly of FIGS. 18 and 19, parts being broken away.
Figure 21:
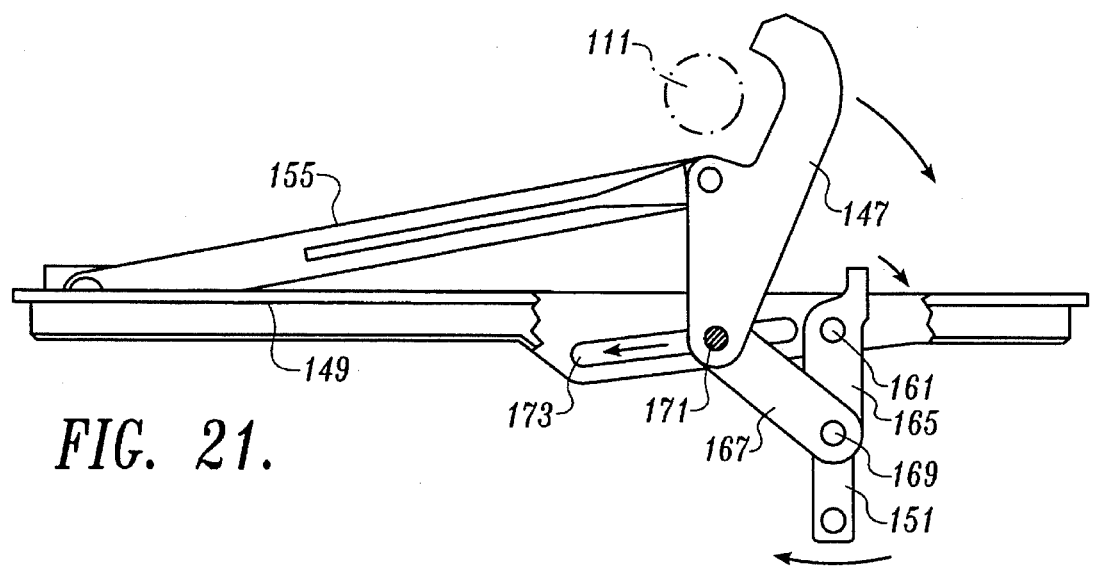
FIG. 21 is a second diagrammatic side elevation illustrating operation of the axle locking assembly of FIGS. 18 and 19, parts being broken away.

As best seen in FIGS. 19, 20, and 21, handle 151 is pivoted on the frame plate 149 by a horizontal transversely extending shaft 161. As seen in FIG. 19, shaft 161 projects from the opposite sides of the handle through the adjacent section of the frame plate and into cutouts 163 where the opposite ends of the shaft are fixed to inner links 165. Such links extend in a forward direction from shaft 161 when the axle hooks are in their locking vertical positions, but rearward when the axle hooks are retracted. The locked position is illustrated in FIGS. 18, 19, and 20.

The ends of inner links 165 remote from the shaft 161, i.e., the swinging ends of the links, are pivotally connected to corresponding ends of outer links 167 by pivot pins 169. The opposite end portions of the outer links 167 are pivotally connected to cross pins 171 projecting transversely from the lower end portions of the axle hooks 147. Cross pins 171 are guided for linear movement essentially fore and aft of the respective tray in elongated linear slots 173 formed in the frame plate 149.

Figure 23:
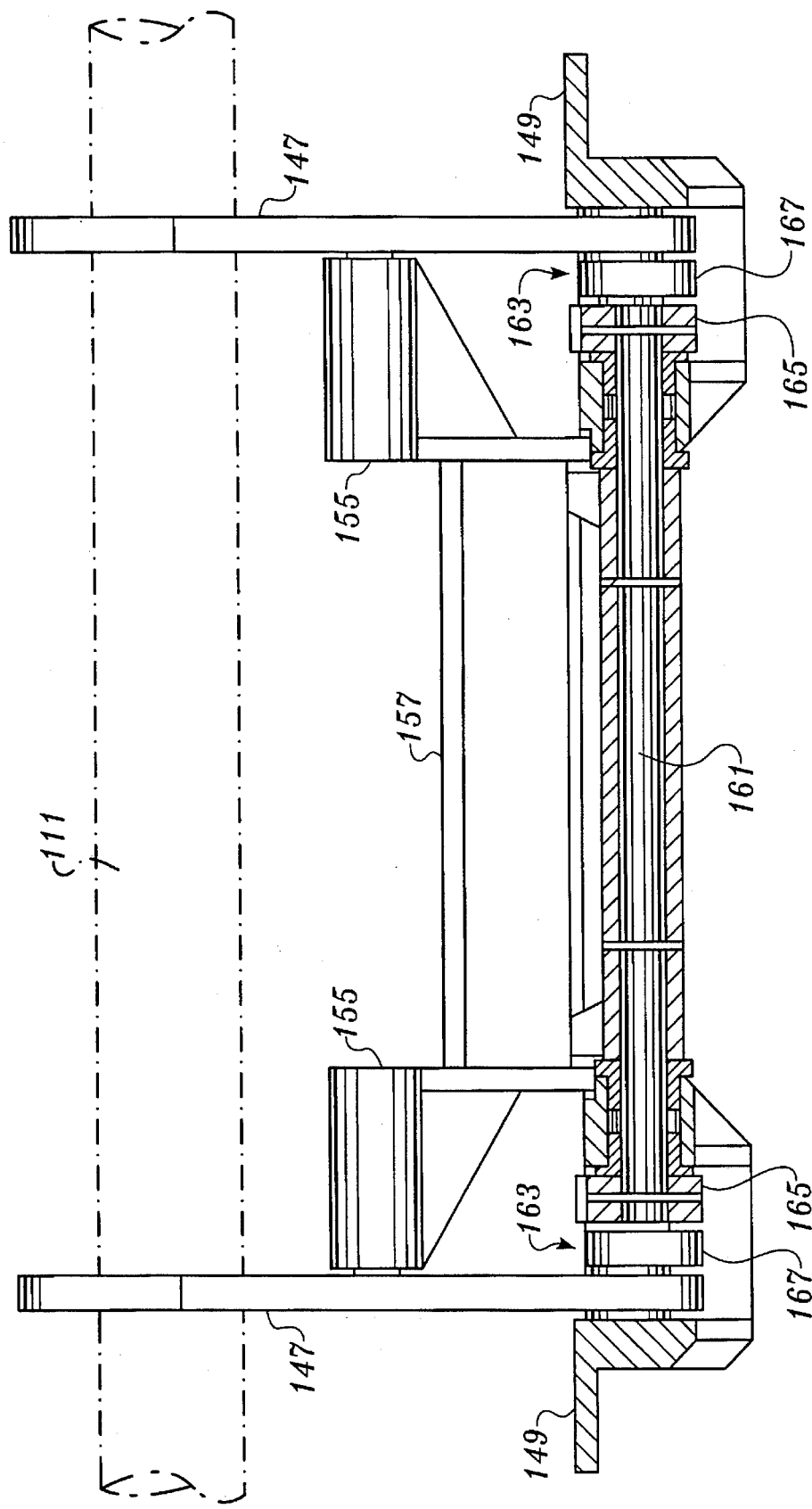
FIG. 23 is a section along line 23—23 of FIG. 19.

FIG. 23 illustrates the relative positions of the axle hooks 147, arms 155 connected by the plate 157, handle shaft 161, inner rotating links 165, and outer sliding links 167. Links 165 and 167 and the bottom portions of the axle hooks 147 all are received within the cutouts 163 of the frame plate 149.

Figure 22:
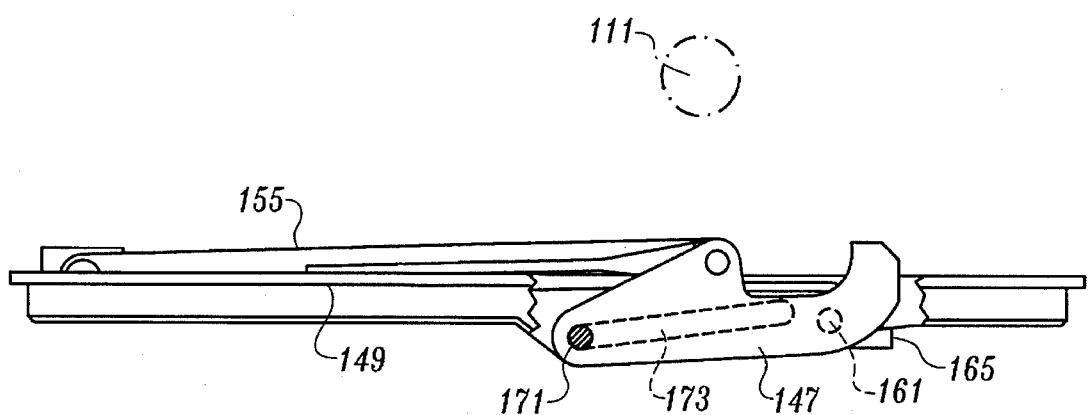
FIG. 22 is a third diagrammatic side elevation illustrating operation of the axle locking assembly of FIGS. 18 and 19, parts being broken away.

Movement of the various components of the axle lock 145 is illustrated in FIGS. 20, 21, and 22. With reference to FIG. 20, when the hooks 147 are in their vertical locking positions with the rearwardly curved upper ends 153 fitted over the litter axle 111, arms 155 are inclined forward and upward at a small acute angle relative to the frame plate 149 and the upper surface of the tray in which the frame plate is mounted. Handle 151 extends forward from its shaft 161 on which the inner rotating link 165 (not visible in FIG. 20 but seen in FIG. 21) is carried. The outer sliding link 167 extends from pivot pin 169 rearward to the cross pin 171 projecting from the bottom end portion of hook 147. In the position illustrated in FIG. 20, i.e., the vertical locking position for the axle hook 147, links 167 hold the cross pins 171 in the forward end portions of the elongated slots 173.

As seen in FIG. 21, in order to retract the axle hooks to release the axle 111 of the litter, the handle is rotated clockwise as viewed in FIGS. 20 and 21 about its shaft 161. The inner link 165 rotates with the handle and thrusts the outer link 167 rearward, thereby moving cross pin 171 rearward in the slots 173. Approximately 180° rotation of the handle 151 is required in order to move pin 171 to the rear end portion of the slots 173. Such motion rotates the axle hook 147 clockwise and retracts it into the frame plate 149 as the arms 155 swing downward through a small angle toward the top of the frame plate. The fully retracted position is illustrated in FIG. 22.

As seen in FIG. 19, handle 151 can carry spring-loaded detent fingers 175 engageable in notches of the frame plate 149 to maintain the handle in the locked position. Similar notches can be provided toward the central portion of the frame plate to hold the handle in the rearward swung, released position.

The result is that patient litter can be quickly and easily inserted on and locked to a tray during loading of a patient, and just as easily be released for unloading of the patient at the destination facility.

Referring back to FIG. 15, after the patient litter L1 is locked in place on the upper tray 61, the upper tray can be retracted into the lower tray 67. If only one patient is being transported, the two trays remain nested together. However, if more than one patient is to be transported within the same vehicle, it will be necessary to separate the upper and lower trays 61 and 67 and, preferably, to position upper tray 61 above and behind the lower tray.

Figure 24:
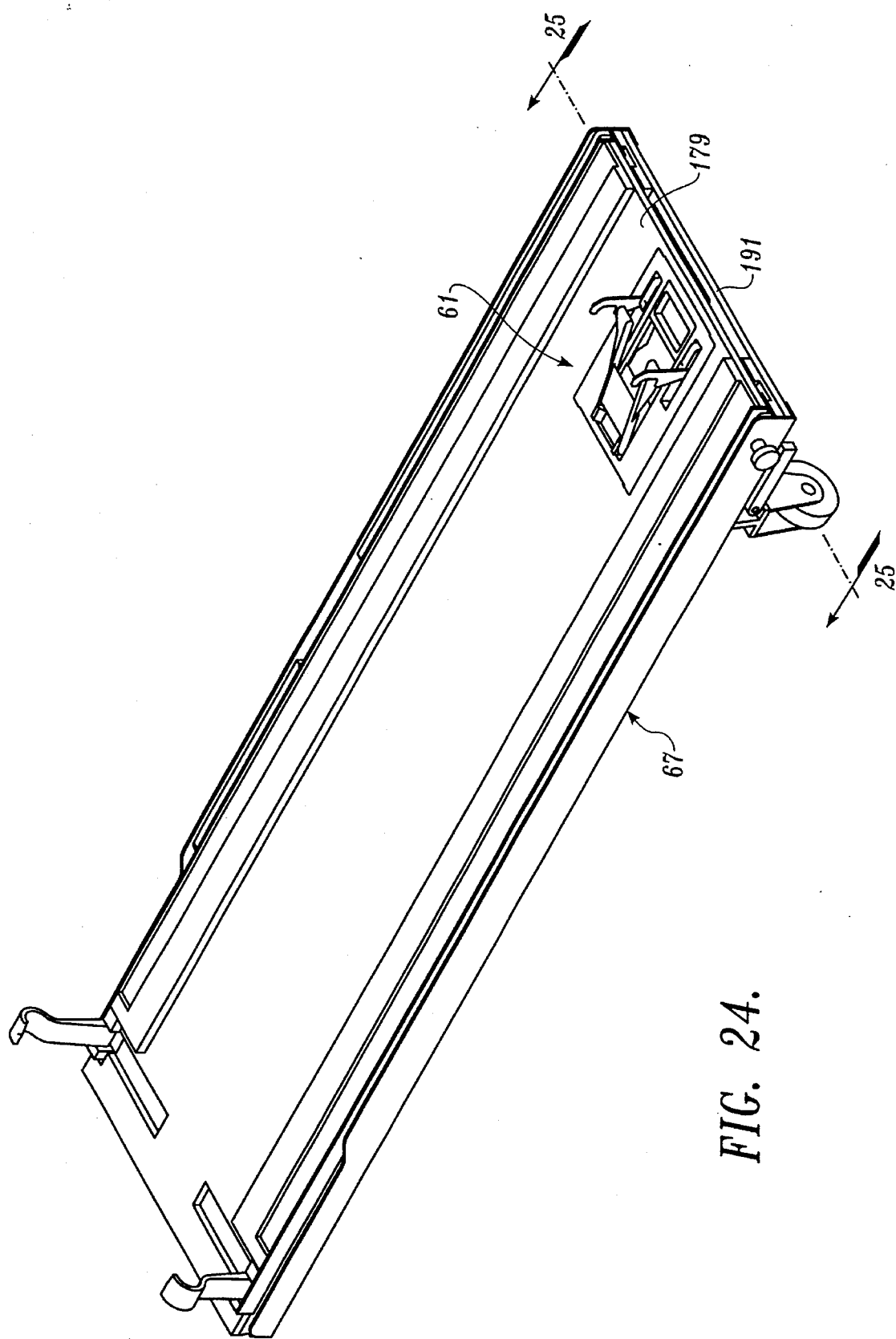
FIG. 24 is a top right perspective of the litter supporting upper tray and lower tray referred to above in connection with FIG. 15.
Figure 25:
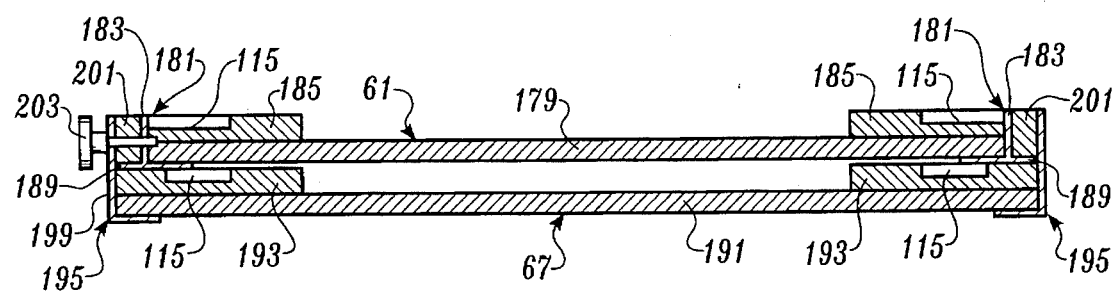
FIG. 25 is a vertical section along line 25—25 of FIG. 24.
Figure 26:
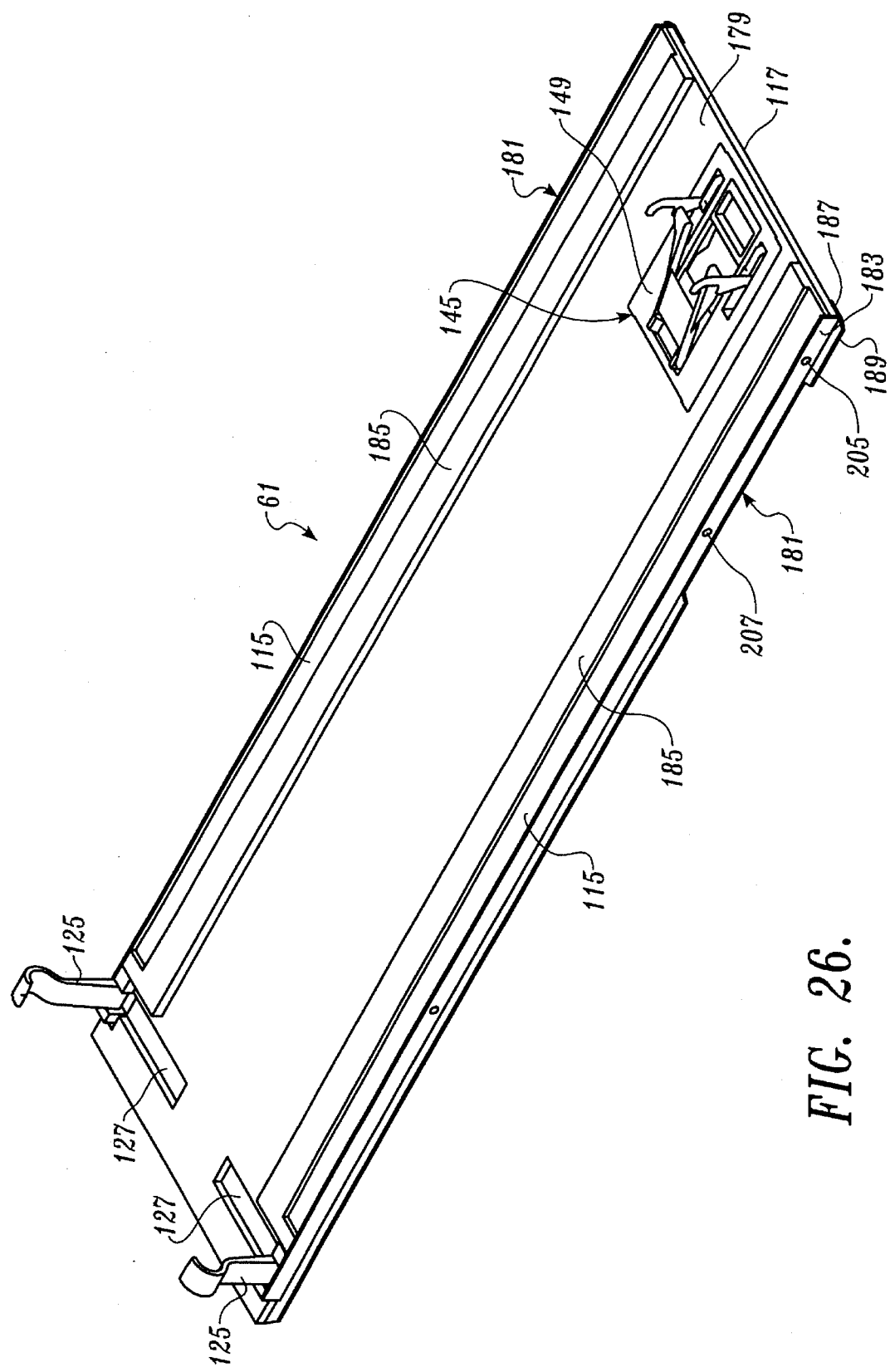
FIG. 26 is a top right perspective of the upper tray of FIG. 24 separated from the lower tray.
Figure 27:
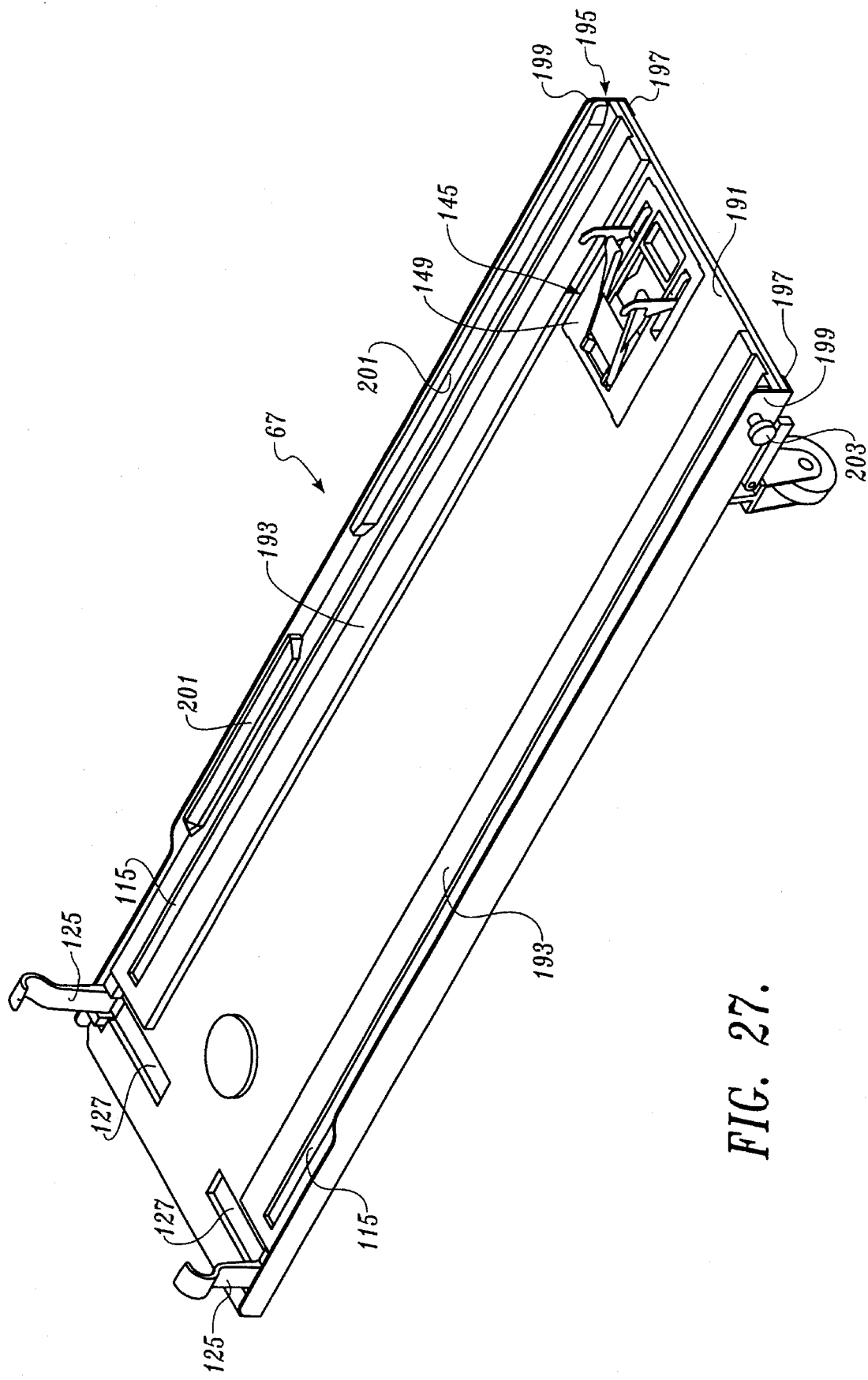
FIG. 27 is a top right perspective of the lower tray of FIG. 24 separated from the upper tray.

Several elements are included in both the upper and lower trays 61 and 67 to accomplish the proper nesting and separation of the trays. FIGS. 24 and 25 illustrate the interconnection of the upper tray 61 with the lower tray 67, whereas FIG. 26 shows the upper tray separated from the lower tray, and FIG. 27 shows the lower tray separated from the upper tray. As best seen in FIG. 26, upper tray 61 includes a central rigid panel 179 having the recesses 127 for retainers 125 and a cutout for the axle lock 145 including its frame plate 149. Inverted T slide strips 181 extend along the right and left sides of the tray panel 179. Each slide strip includes an upright web portion 183 extending upward beyond short elongated edge blocks or strips 185. Strips 185 are notched to form the shallow tracks 115. Webs 183 border the outer sides of the tracks of the upper tray. Slide strips 181 also include inward-extending arms 187 secured to the marginal portions of the underside of panel 179 and outward-extending arms 189 projecting outward from the bottom of the vertical web 183.

As best seen in FIGS. 25 and 27, the lower tray 67 includes a central panel 191 having the recesses 127 (FIG. 27) for the associated litter retainers 125 and a cutout for the litter axle lock 145 including its frame plate 149. These aspects of the lower tray are identical to the corresponding parts of the upper tray. However, panel 191 of the lower tray 67 is wider than the panel of the upper tray, and the tracks 115 of the lower tray (which must be spaced apart the same distance as the tracks for the upper tray) are fully formed in long edge pieces 193 secured to the upper longitudinal margins of panel 191. Structural angular strips 195 extend along the opposite edges of the panel, including inward extending arms or flanges 197 secured to the bottom longitudinal margins of the panel and upward extending flanges 199 that project above the tops of the edge pieces 193. Flanges 199 carry inward-projecting rails 201 which are spaced above the tops of the edge pieces 193 to form inwardly opening channels.

As seen in FIG. 25, the channels between the edge pieces 193 and rails 201 are sized to receive the outwardly projecting cross arms 189 of the inverted T slide strips. In addition, webs 183 of such strips are in close proximity to the inner edges of the rails 201. The result is a sliding, interfitting connection of the upper tray 61 over the lower tray 67.

As seen in FIG. 27, the lower tray has a locking pin 203 extending inward through one of the flanges 199 at the head end portion of the lower tray. The shank of pin 203 is positioned and sized to fit in holes 205 and 207 (shown in FIG. 26) in the upright web portions of the inverted T slide strip 181 at the same side. By fitting the locking pin 203 in the hole 205 adjacent to the head end 117 of the upper tray, the upper tray is locked in position substantially registered over the lower tray. In order to extend the upper tray for loading of a patient, the locking pin is withdrawn, and the upper tray 61 is slid forward relative to the lower tray until the pin registers with hole 207, whereupon the pin is reinserted to lock the upper tray in the forward or outward shifted position.

Figure 28:
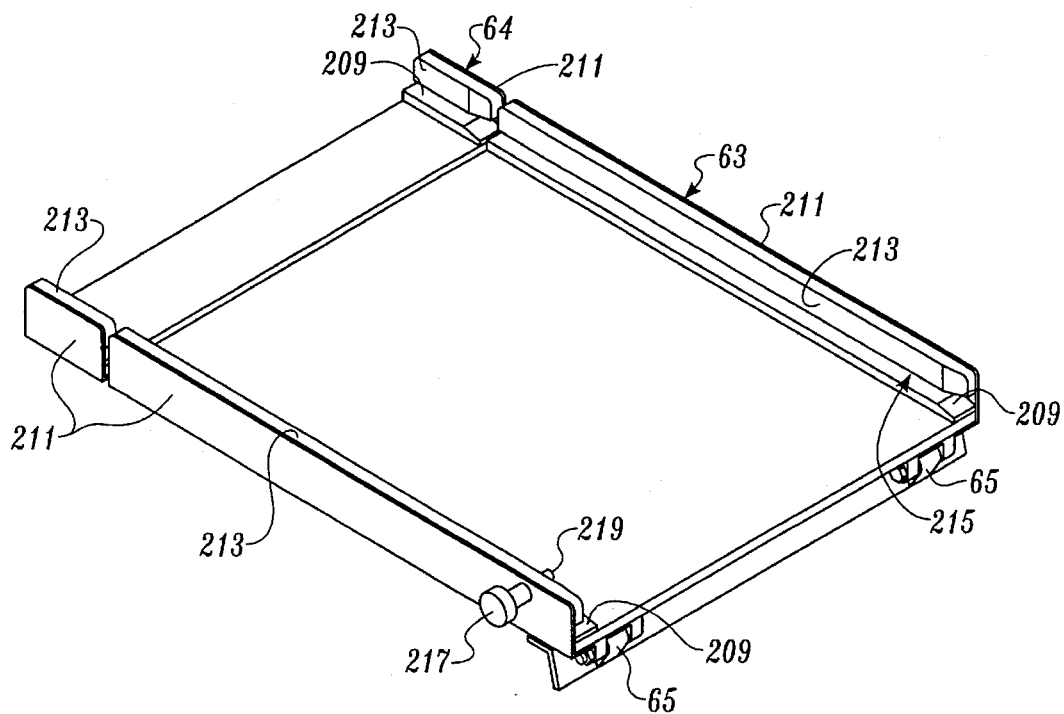
FIG. 28 is a top right perspective of an additional component of the patient transport system in accordance with the present invention, namely, a bedplate for retaining the upper tray when separated from the lower tray.
Figure 29:
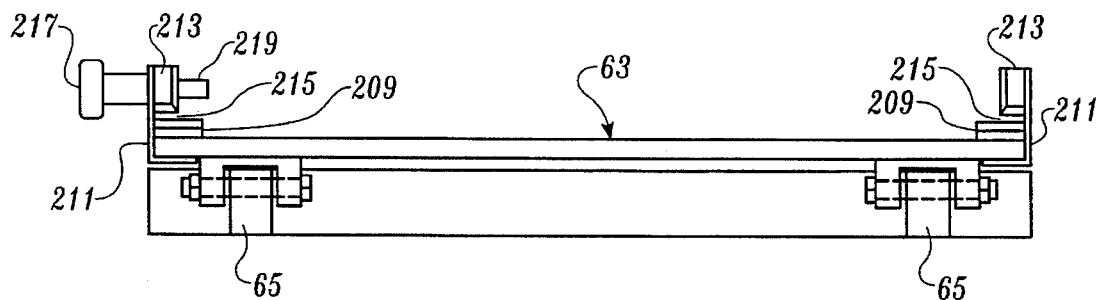
FIG. 29 is an end elevation of the bedplate of FIG. 28.

When the upper tray is transferred from the lower tray to the deck-mounted bedplate assembly, the interconnection of the upper tray with the bedplate assembly is substantially the same as the interconnection of the upper tray with the lower tray. With reference to FIGS. 28 and 29, as previously described the front plate 63 is connected to the upper deck 55 by hinges 65. The rear plate 64 is stationarily secured to the deck. Both portions have short edge strips 209 secured to the top longitudinal margins of the plates, and angular structural members 211 which correspond to the angular structure members (195) of the lower tray. Rails 213 are supported on the upward-extending flanges of structural members 211, spaced above the tops of the edge strips 209 to form channels 215 opening inward toward the center of the plates. Also, the forward bedplate 63 includes a locking pin 217 corresponding to the locking pin of the lower tray, including a shank 219 fittable into the holes 205 and 207 (FIG. 26) of the upper tray.

Figure 30:
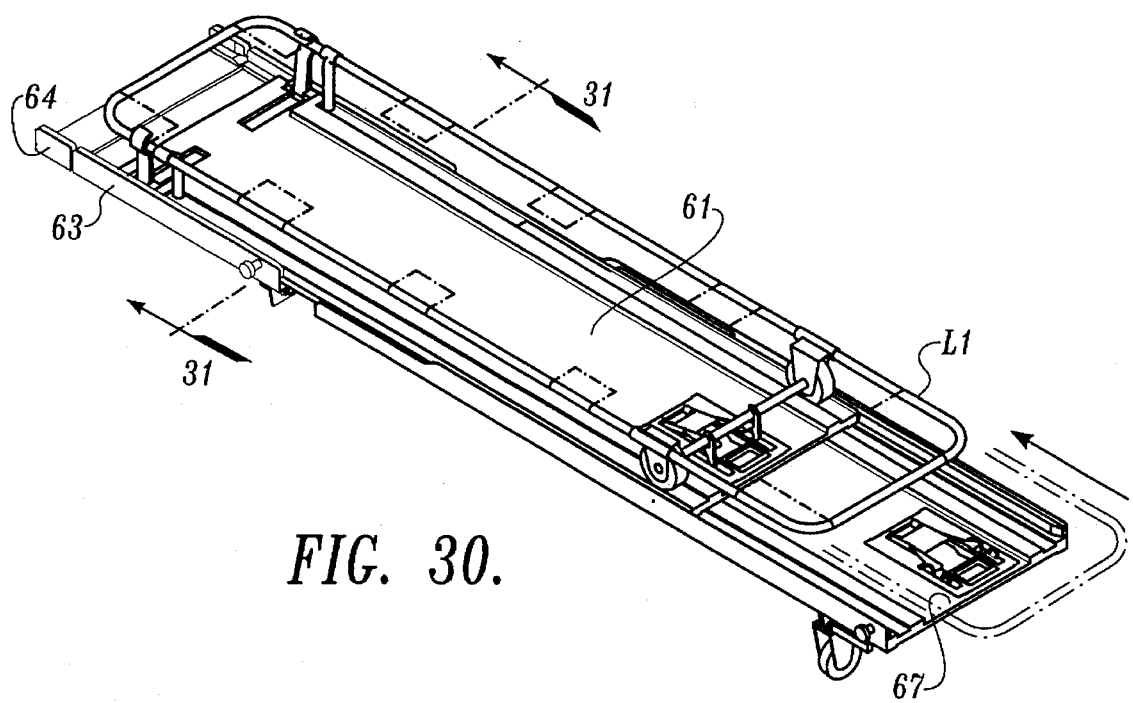
FIG. 30 is a top right perspective of interfitted components of the patient transport system of the present invention, namely, a lower tray and a litter supporting upper tray in the process of being transferred from the lower tray to a bedplate.
Figure 31:
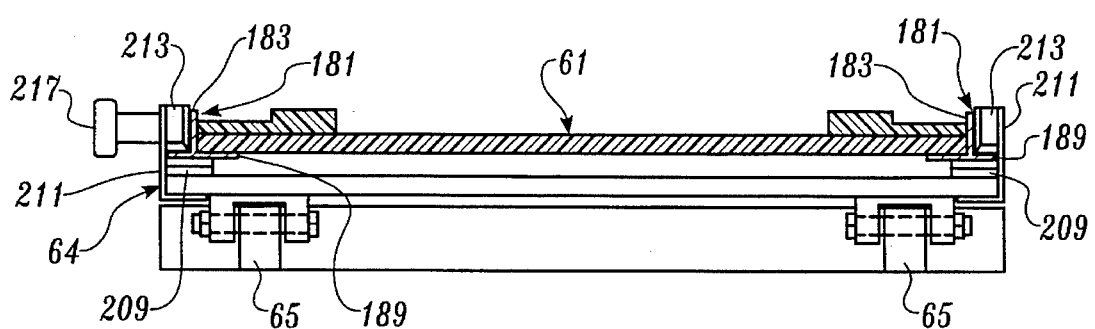
FIG. 31 is a vertical section along line 31—31 of FIG. 30.

FIG. 30 illustrates the upper tray 61 carrying the first patient litter L1 being transferred from the lower tray 67 to the bedplates 63, 64. As seen in the sectional view of FIG. 31, the inverted T slide strips 181 rest on the edge strips 209 of the bedplate, with the outward projecting cross arms 189 fitted in the channel between the rails 213 and support strips 209, and the upright webs 183 close alongside the rails. When the transfer of the upper tray 61 onto the bedplate has been completed, such that the lower tray 67 is no longer interengaged with the upper tray, the lower tray can be separated from the upper tray by collapsing the lift assembly on which the lower tray is mounted. The rear stationary plate prevents the front plate from swinging. Also, the locking pin 217 of the bedplate can be used to secure the upper tray in position interlocked with the bedplate.

Figure 32:
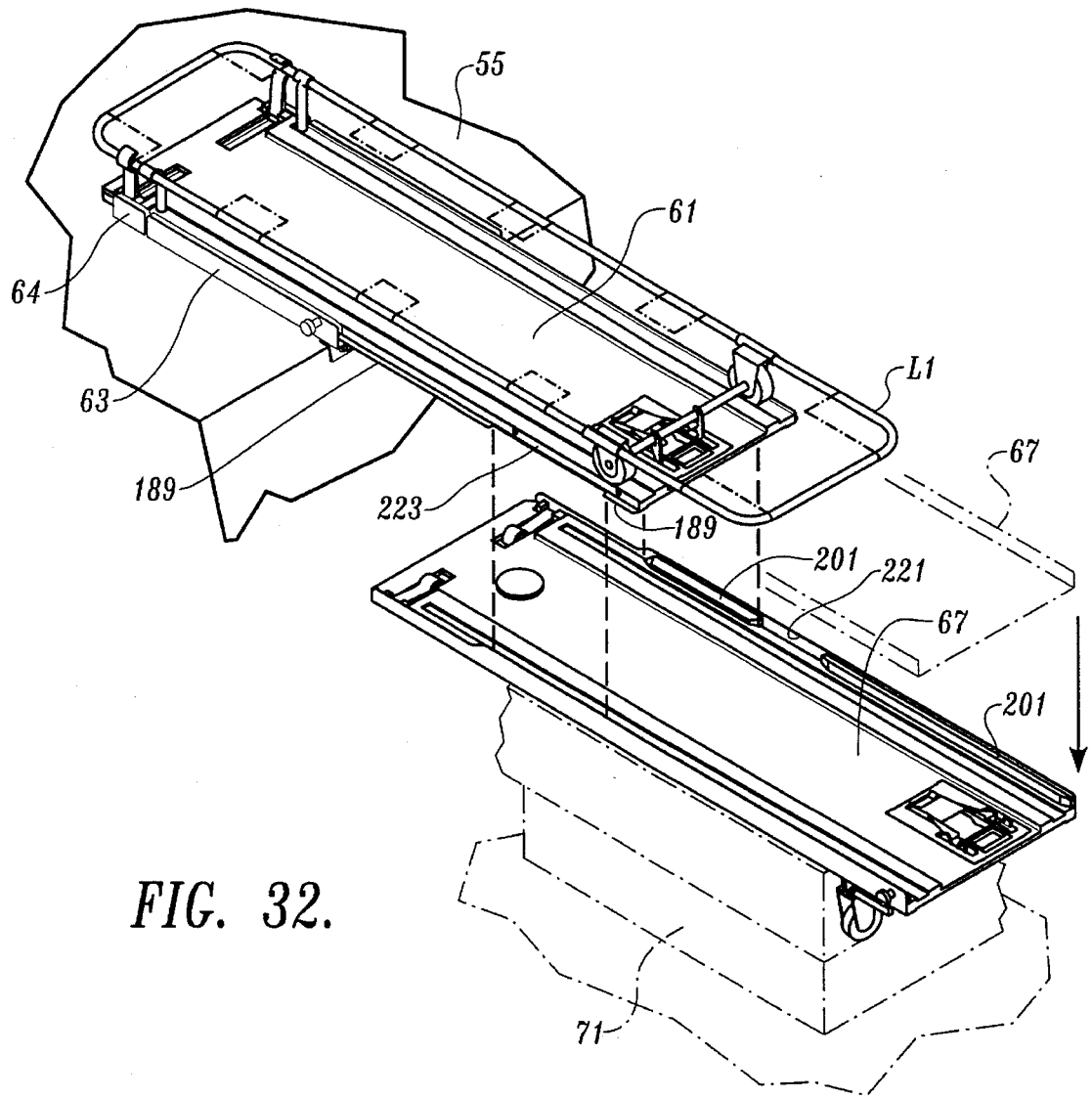
FIG. 32 is a top right perspective of the components of the present invention illustrated in FIG. 30, but with parts in different positions.

As illustrated in FIG. 32, it is not necessary to move the upper tray 61 all the way off of the lower tray 67 in order to disengage it from the lower tray. Preferably the rails 201 of the lower tray are not continuous along each side, but rather have at least one space 221 at each side between adjacent strips of the rails. Similarly, the outward extending cross arms 189 of the upper trays are not continuous but preferably have a notch 223 which, when the upper tray has reached a predetermined position relative to the bottom tray, is registered with one of the rail strips 201. Strips 201 and cross arms 189 are spaced to allow the trays to be separated when the upper tray still partially overlies the lower tray.

The nesting of the upper tray in the lower tray allows both trays to be stowed together without taking up additional room for the second tray. Because of this arrangement, both trays can be easily and conveniently left within the vehicle ready for use if needed without getting in the way or causing obstruction when not needed.

Figure 33:
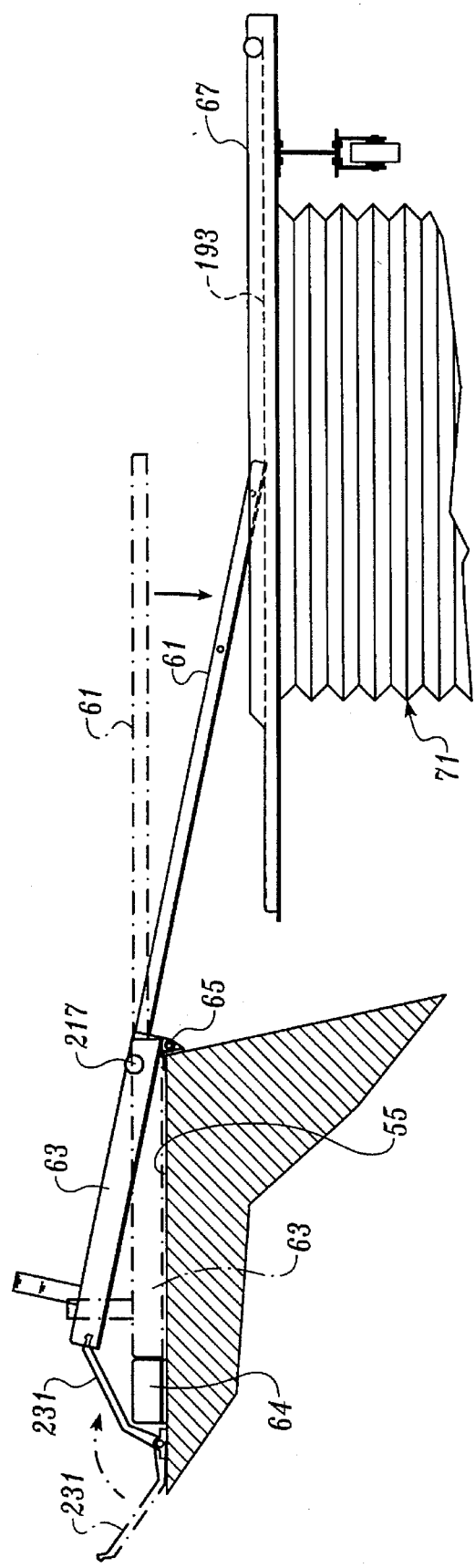
FIG. 33 is a diagrammatic, fragmentary, side elevation of components of the patient transport system in accordance with the present invention, including a lift assembly for a lower tray.

The fit of the upper tray in the lower tray and in the bedplate is quite snug. One advantage of the pivotal mounting of the front bedplate 63 on the upper rear deck of the aircraft is to allow for some variation in the position of the lower tray supported by the lift assembly when the transfer of the upper tray to the front bedplate is made. In addition, as illustrated diagrammatically in FIG. 33, such pivotal connection of the front bedplate 63 to the upper rear deck 55 by hinges 65 permits an alternative carrying position for a single patient. It sometimes is desirable to maintain a traumatized patient at a slightly inclined angle, usually with the head below the feet. In accordance with the present invention, the upper tray 61 can be partially transferred into the front bedplate 63 and the locking pin 217 actuated to prevent further longitudinal adjustment of the position of the upper tray to engage in a hole provided in the side of the upper tray toward its foot end. Then the lift carriage 71 can be partially collapsed to lower the lower tray 67, which will have the effect of tilting the upper tray. A latch 231 can be provided on the upper rear deck 55 adjacent to the bedplate 63 to prevent swinging of the bedplate and the upper tray 61 interlocked therewith beyond a predetermined angle.

FIGS. 34 through 38 illustrate the preferred lift assembly 71 in accordance with the present invention. Such assembly includes a bottom rectangular frame 243 and a top rectangular frame 245. The top rectangular frame carries the support plate 247 on which the lower litter supporting tray is mounted.

Frames 243 and 245 are interconnected by pairs of cross links 249 and 251. Links 251 have their bottom end portions 253 pivoted to the bottom frame toward its forward end. Links 249 have their forward end portions 255 pivoted to the upper frame 245 at its forward end. Links 249 and 251 are provided at both the left and right sides of the assembly. Links at each side have their central portions connected by a pivot 257.

The rear end portions of links 249 and 251 carry rollers received in horizontal channels, namely, channels 259 carried by the bottom frame for receiving rollers projecting from the rear ends of the rearward and downward inclined links 249 and channels 261 secured to the top frame and receiving rollers projecting from the rear ends of the upward and rearward inclined links 251.

The lift jack 263 for the assembly 71 is supported in the base frame 243 and includes an electric ram 265 pivotally supported on the front portion of the base frame and having a rearward extending spindle 267 pivotally connected to a cross member 269 (FIG. 35) extending between the lower, rearward end portions of links 249.

For safety the mechanical components of the lift assembly are enclosed in a pleated bellows 273.

The end portions of the cross links define a parallelogram. The horizontal dimension of the parallelogram is directly controlled by the lift jack 263. Retraction of the spindle 267 of the lift jack decreases the horizontal extent of the parallelogram, thereby increasing the angle of inclination of the links 249 and 251 and raising the top rectangular frame and the support plate 247 carried thereon. Similarly, extension of the spindle of the jack has the effect of decreasing the angle of inclination of the cross links and lowering the support plate.

Figure 35:
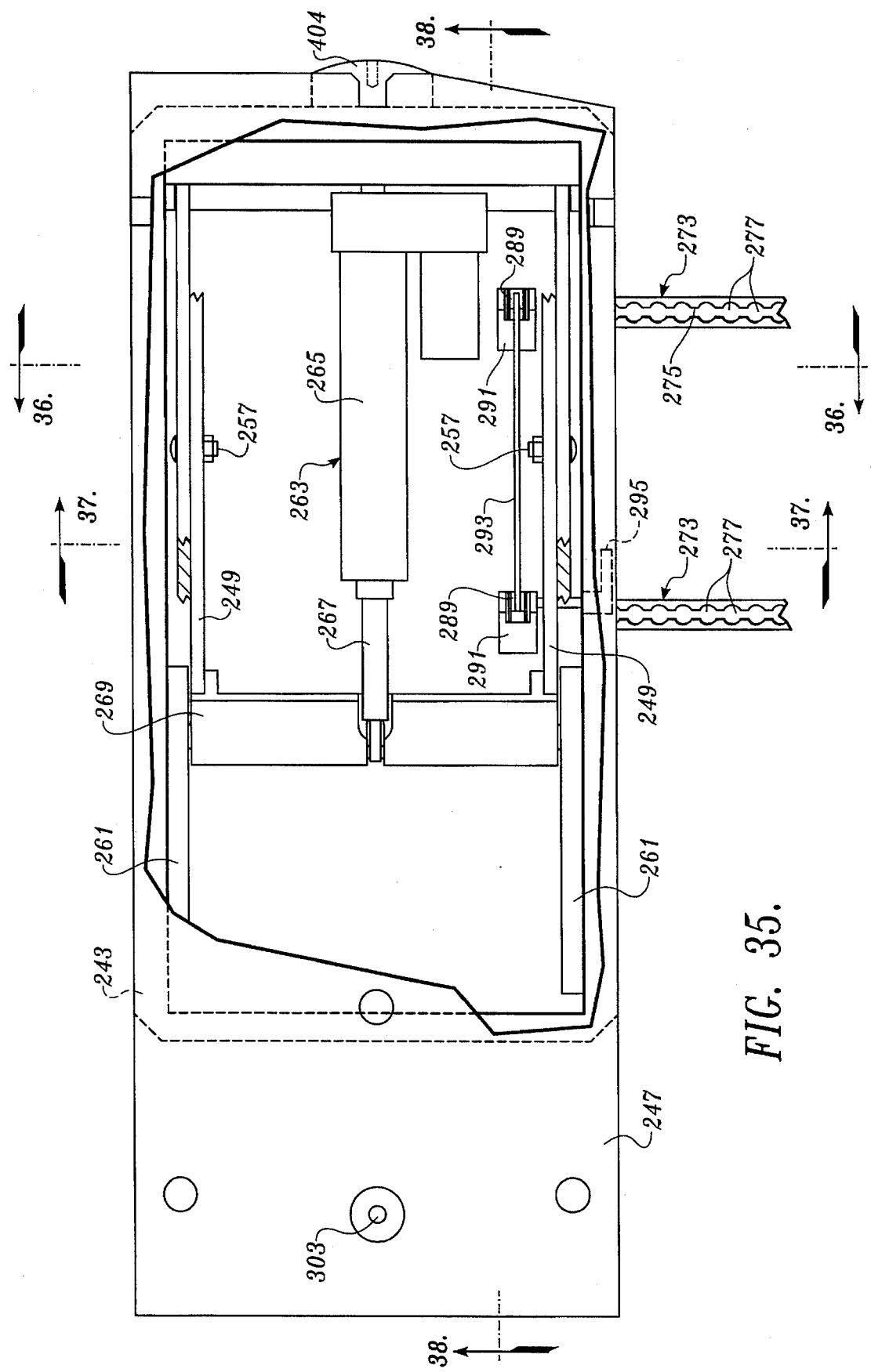
FIG. 35 is a top plan of the lift assembly of FIG. 34 with parts broken away.

The lift assembly preferably is mounted in the aircraft for movement along conventional floor tracks 273 of a type commonly used in aircraft floors for securing cargo or adjusting the position of passenger seats, for example. As seen in FIG. 35, such tracks include a continuous central channel portion 275 and regularly spaced circular apertures 277. In accordance with the present invention, the lift carriage is supported in the tracks on wheels 279 best seen in FIGS. 36 and 37. Such wheels are mounted on the base frame 243 by wheel brackets 281. The wheels are sufficiently narrow so as to roll in the continuous channel 275 (FIG. 35) of the floor tracks, for adjusting the position of the lift carriage transversely of the aircraft.

Figure 34:
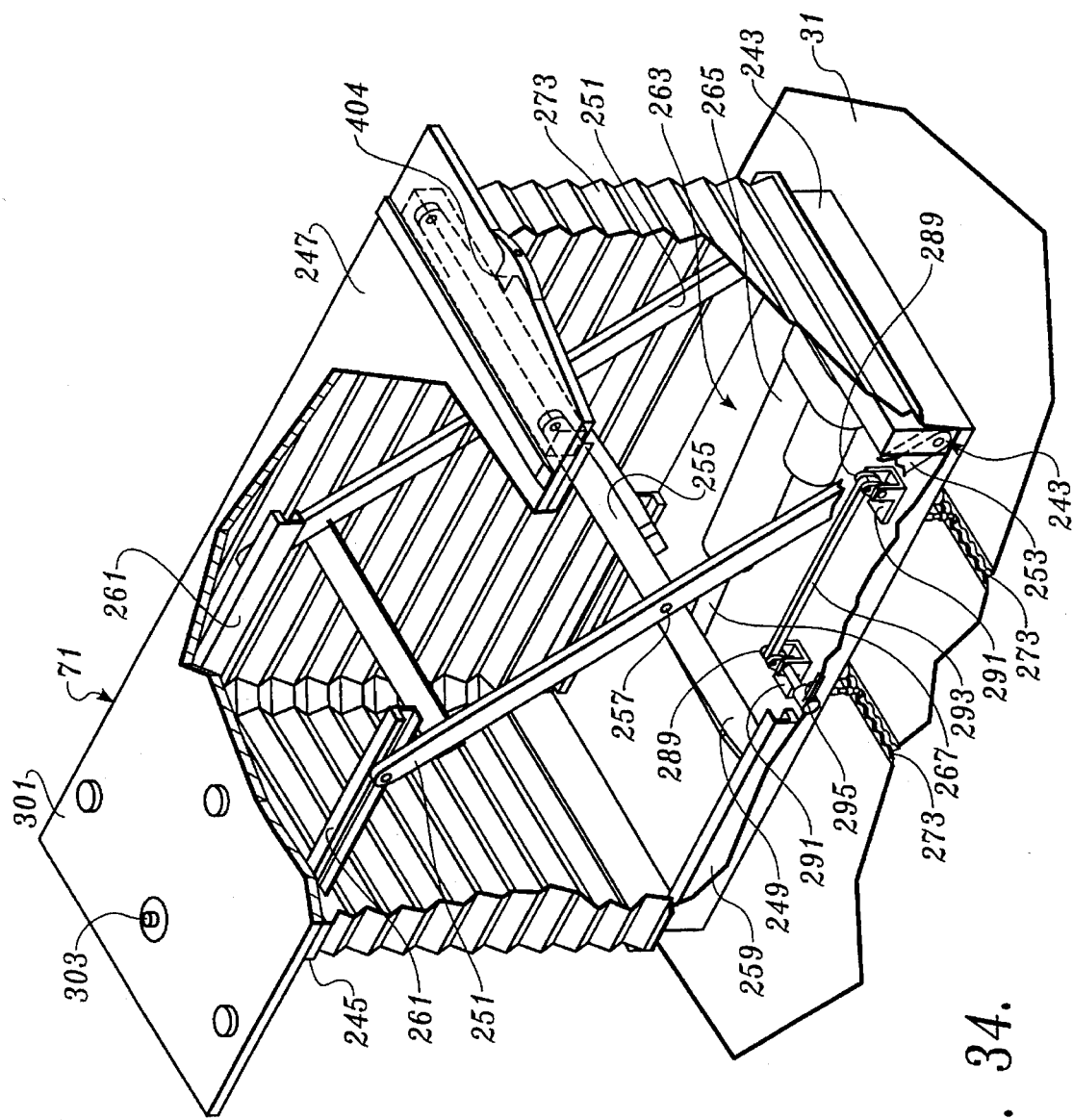
FIG. 34 is a top right perspective of the lift assembly of FIG. 33.
Figure 36:
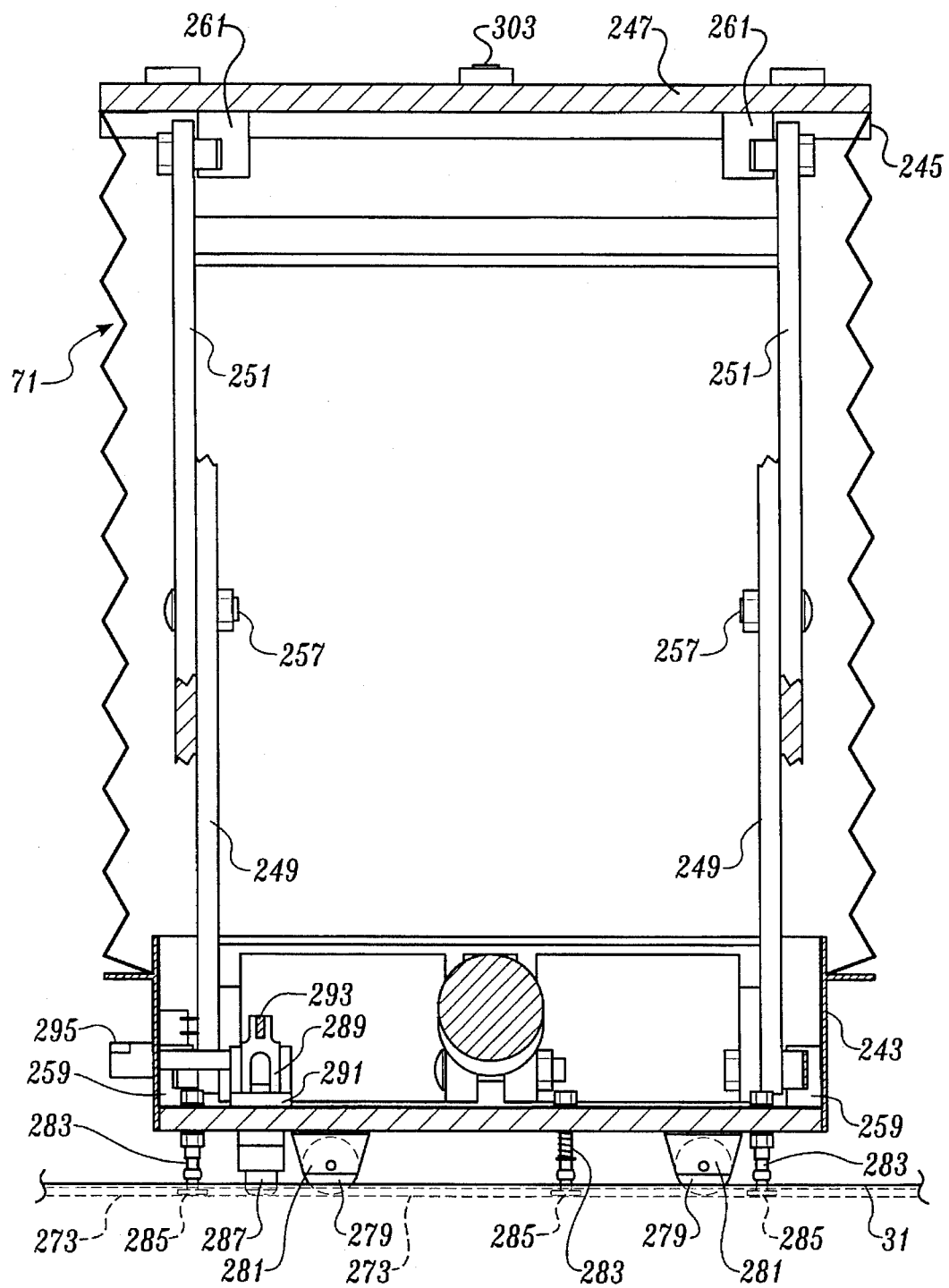
FIG. 36 is a vertical section along line 36—36 of FIG. 35.
Figure 37:
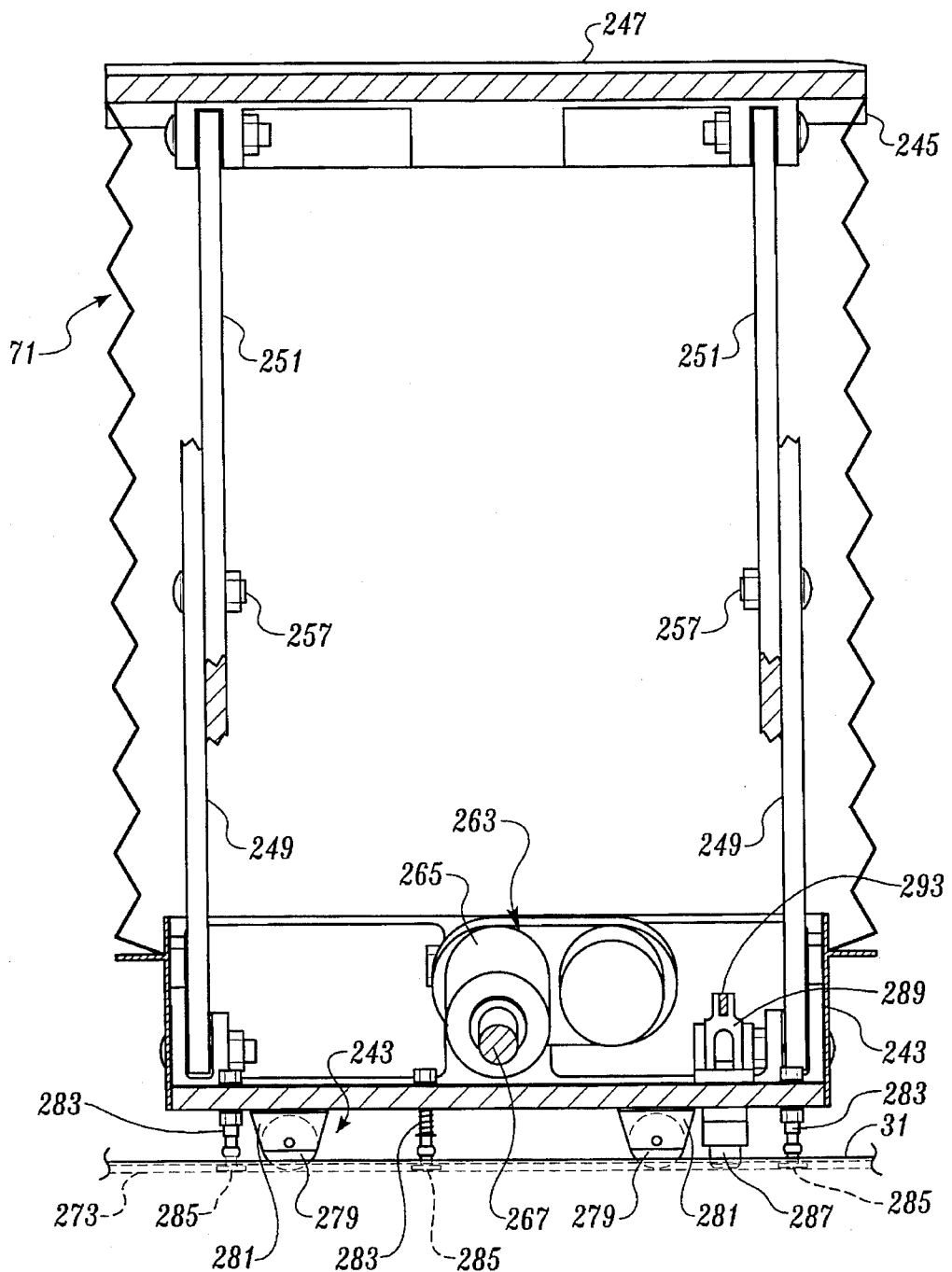
FIG. 37 is a vertical section along line 37—37 of FIG. 35.
Figure 38:
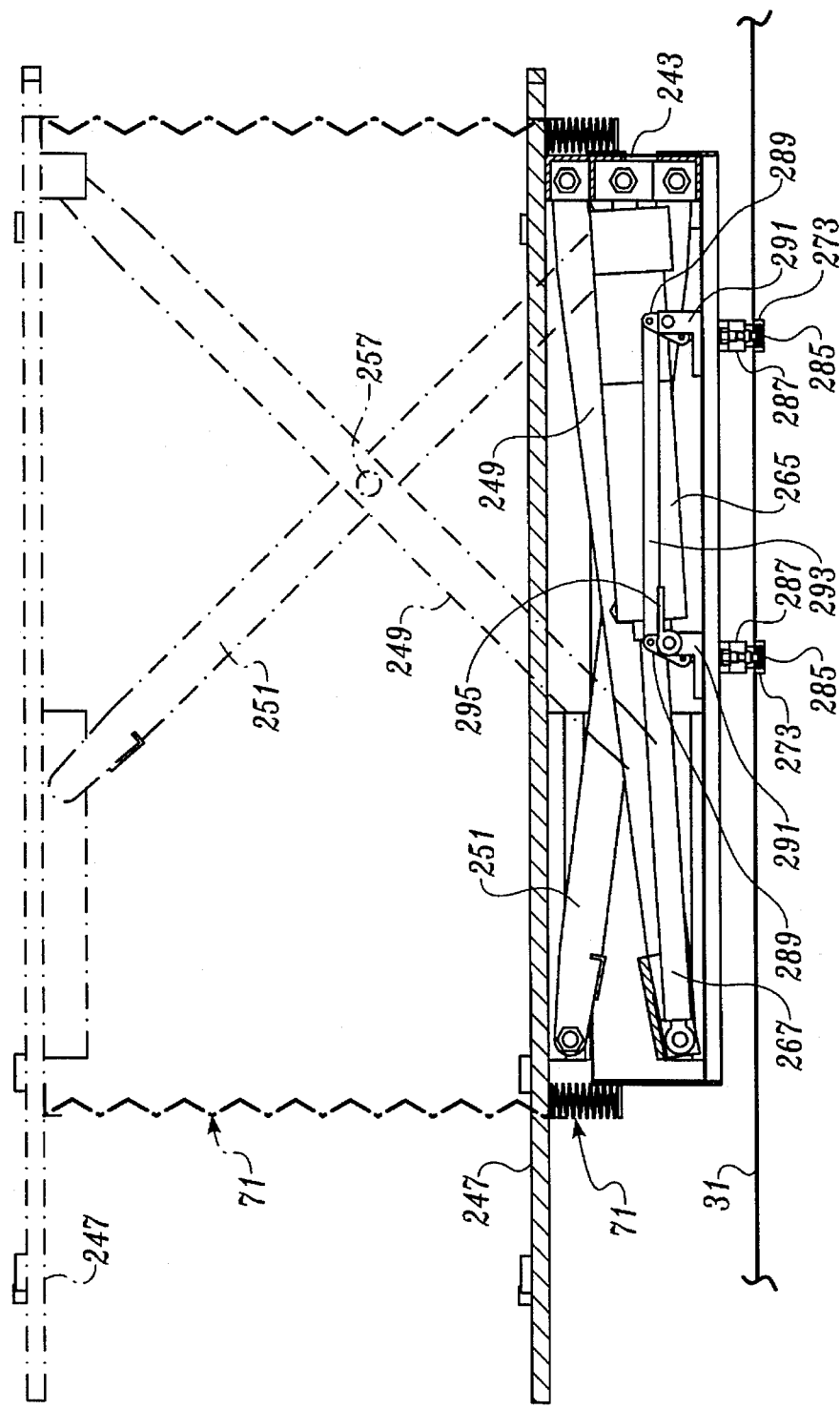
FIG. 38 is a vertical section along line 38—38 of FIG. 35.

With reference to FIG. 36, movement of the lift assembly 71 in the tracks 273 is guided by legs 283 which depend from the base frame 243 and have enlarged foot pads 285 fitted in the base of the tracks. In addition, the lift assembly can be locked in a desired position by projection of thrust pins 287 into selected circular holes of the two tracks. Two such thrust pins are provided, one for each track, and each pin is pivotally connected to the end of a generally upright actuating link 289. As seen in FIG. 34, links 289 are pivoted on brackets 291 mounted on the floor of the base frame and have their upper end portions pivoted to the opposite end portions of a fore-and-aft extending link 293. A control lever 295 is accessible from the exterior of the base frame 243. Such lever controls the position of the rearwardmost link 289 and, through the connecting rod 293, the position of the forward actuating link. Turning the lever in one direction swings the links so as to retract the thrust pins and thereby free the lift carriage for movement transversely of the aircraft along the tracks 273; whereas turning lever 295 in the other direction has the effect of projecting the thrust pins downward into circular holes of the tracks. The pins are sized to be snugly received within the holes so that, when projected, the lift assembly is locked in position and cannot be moved until the actuating lever is turned.

Figure 39:
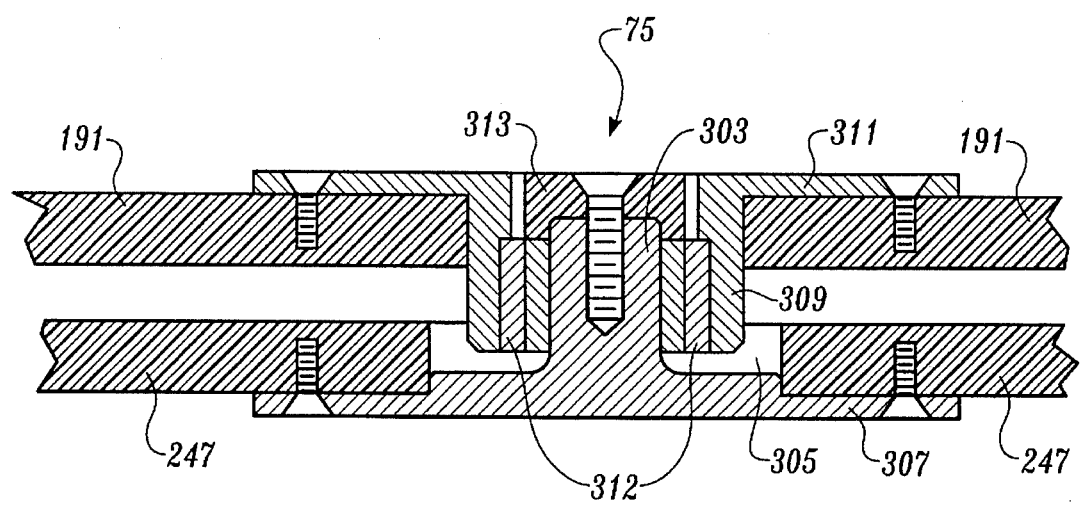
FIG. 39 is an enlarged detailed vertical section through components of the patient transport system in accordance with the present invention, namely, the area of a pivot between the lift assembly and a lower tray.

Again referring to FIG. 34, the top support plate 247 of the lift assembly 71 includes a rearward extending lip portion 301 having the pivot pin 303 by means of which the lower, litter-supporting tray is connected to the support plate. The details of such connection are shown in FIG. 39. Top plate 247 of the lift carriage has a circular hole 305 through which the pivot pin 303 extends. Such pin is formed integrally with a bottom disc 307 secured to the underside of support plate 247. Similarly, panel 191 of the lower tray has an aperture for a socket member 309 formed integrally with a disc 311 secured to the upper side of the panel. An antifriction bearing 312 is interposed between the pivot pin 303 and the interior of the socket. A retainer washer 313 can be secured over the top of the pivot pin 303 to prevent separation of the tray panel 191 from the support plate 247 by blocking retraction of the bearing.

Figure 40:
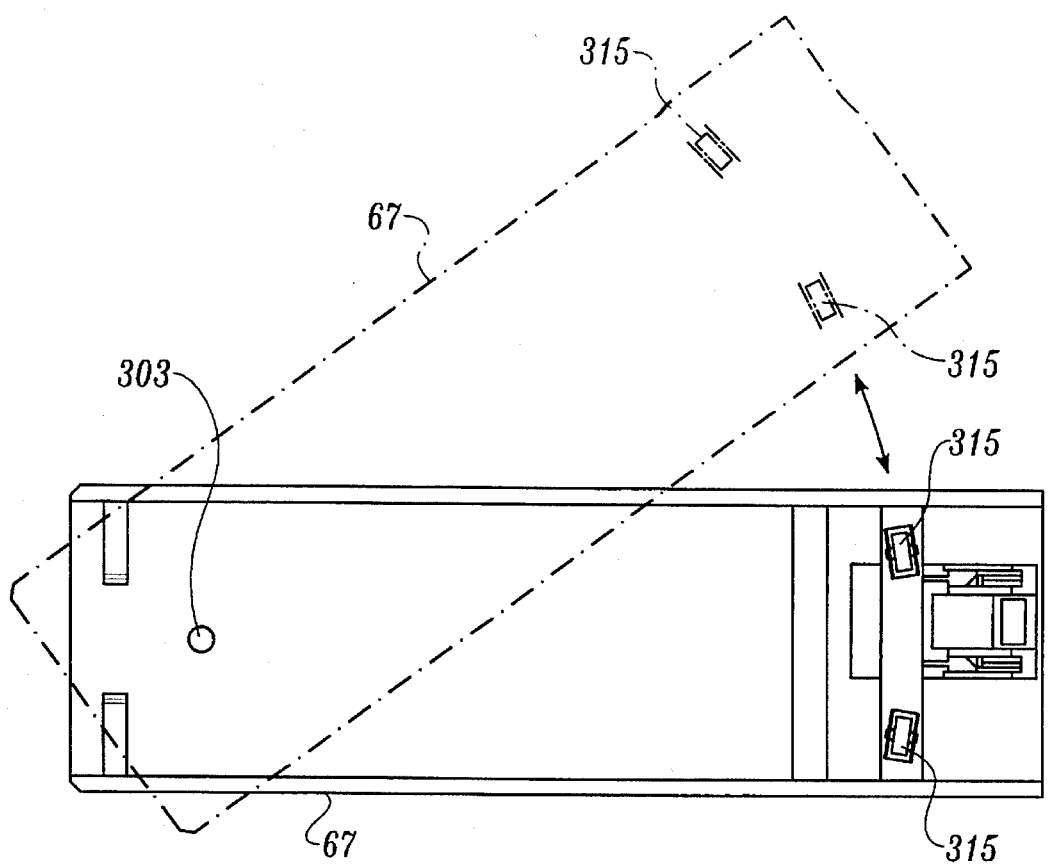
FIG. 40 is a diagrammatic bottom plan of the lower tray.

FIG. 40 (bottom plan) illustrates the swinging motion of the lower tray 67 permitted by the pivot pin 303. When the lift assembly is collapsed, the head end of tray 67 is supported on wheels 315. Such wheels preferably are canted relative to each other. Each wheel is mounted to the underside of the tray for rotation about an axis which intersects the axis of the pivot pin. Consequently, the lower tray can be swung smoothly about the pivot pin.

Figure 41:
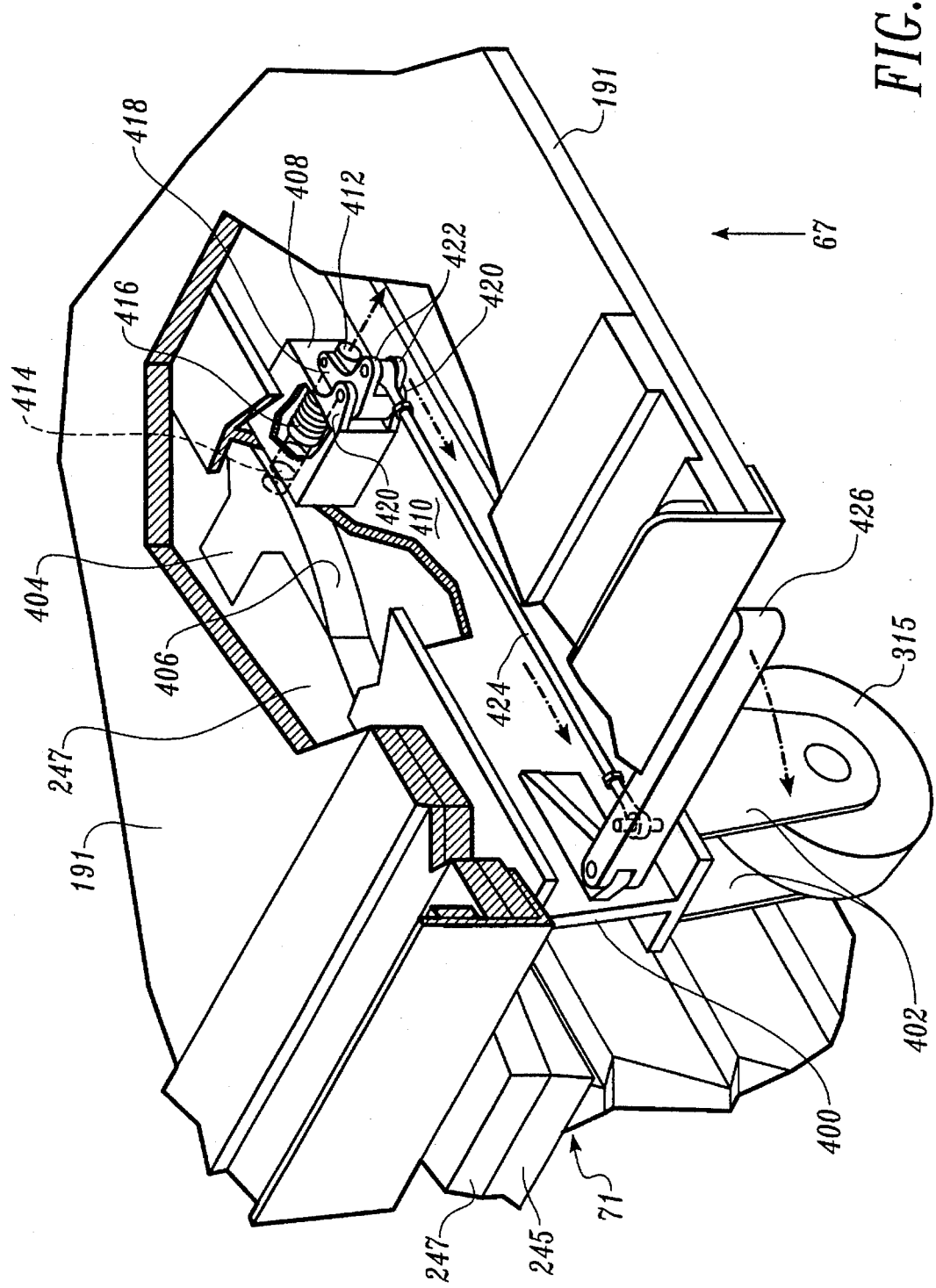
FIG. 41 is an enlarged top right perspective of another component of the preferred patient transport in accordance with the present invention, namely, the assembly for releasably locking the lower tray to the lift assembly.

FIG. 41 illustrates the preferred mechanism for releasably locking the lower tray 67 in position extending longitudinally of the lift carriage 71. The lower tray includes an I beam 400 extending transversely below the tray panel 191 toward the forward or head end portion of the tray. The brackets 402 for the canted wheels 315 are secured to the underside of the I-beam. The top plate 247 of the lift carriage has a cam member 404 which protrudes forward from the head end portion of top plate 247 at its transverse center. Cam member 404 has a horizontal blind bore that opens through the forward end 406 of the cam member.

The releasable locking mechanism includes a rectangular housing 408 mounted on the web 410 of the I beam 400. Housing 408 encloses the central portion of a locking pin 412 which has a rear end portion 414 for fitting in the blind bore of the cam member 406. Pin 412 is biased to a rearward projected position by a compression spring 416.

The rear portion 414 of pin 412 protrudes from the rear of housing 408 and is pivotally connected to transversely extending leg 418 of a bell crank which has its central portion pivoted to mounting lugs or ears 420 projecting rearward from the housing. The bell crank includes a forward projecting leg 422 which is pivotally connected to an actuating rod 424. Rod 424 extends transversely beneath the head end portion of the lower tray 67, forward of the I beam 400, and is pivotally connected to an actuating lever 426. Lever 426 is swingably mounted on the I-beam.

In the position illustrated in FIG. 41, the rear portion 414 of the locking pin 412 bridges between the cam member 404 and the I beam web 410. Consequently, the lower tray 67 is locked in a position extending longitudinally of the lift carriage 71. When it is desired to swing the head portion of the lower tray 67 outward relative to the lift carriage, the actuating lever 426 can be pulled such that, through the action of the bell crank 418, 422, the locking pin 412 is retracted. When the lower tray is swung back toward the longitudinally extending position, the rear portion 414 of the locking pin will engage the forward surface 406 of the cam member 404 and be wedged progressively inward against the force of spring 416 until the pin snaps into the bore of the cam member and automatically locks the lower tray in position.

The close fit of the upper tray 61 over the lower tray 67 provides an important safety feature. When a litter is first loaded onto the upper tray and locked in position, the upper tray is in its extended position, telescoped outward from the lower tray, as illustrated diagrammatically in FIG. 6. Thereafter the upper tray is moved into a position registered over the lower tray 67. In such position, the close fit of the upper tray over the lower tray prevents the handle of the axle locking mechanism from inadvertently being moved to the released position. Similarly, when the upper tray is shifted onto the bedplate assembly, preferably the handle of the axle lock will fit over the front bedplate, so that the litter cannot be released without shifting the upper tray forward, which would required that it be unlocked from the bedplate assembly. Further, the handle for the axle lock of the lower tray fits closely over the support plate of the lift assembly, which prevents inadvertent release of the second patient litter from the lower tray when the lower tray is in its longitudinally extending position. It is preferred that it be necessary to swing the lower tray relative to the lift assembly in order to release the axle lock.

During transfer and transport of a patient, the patient may need portable equipment or supplies positioned close to and, sometimes, connected to the patient. FIGS. 42–45 show a novel bridge assembly 500 for carrying medical equipment along with the patient as the patient is loaded, transferred within the aircraft, and unloaded at the destination facility.

Figure 42:
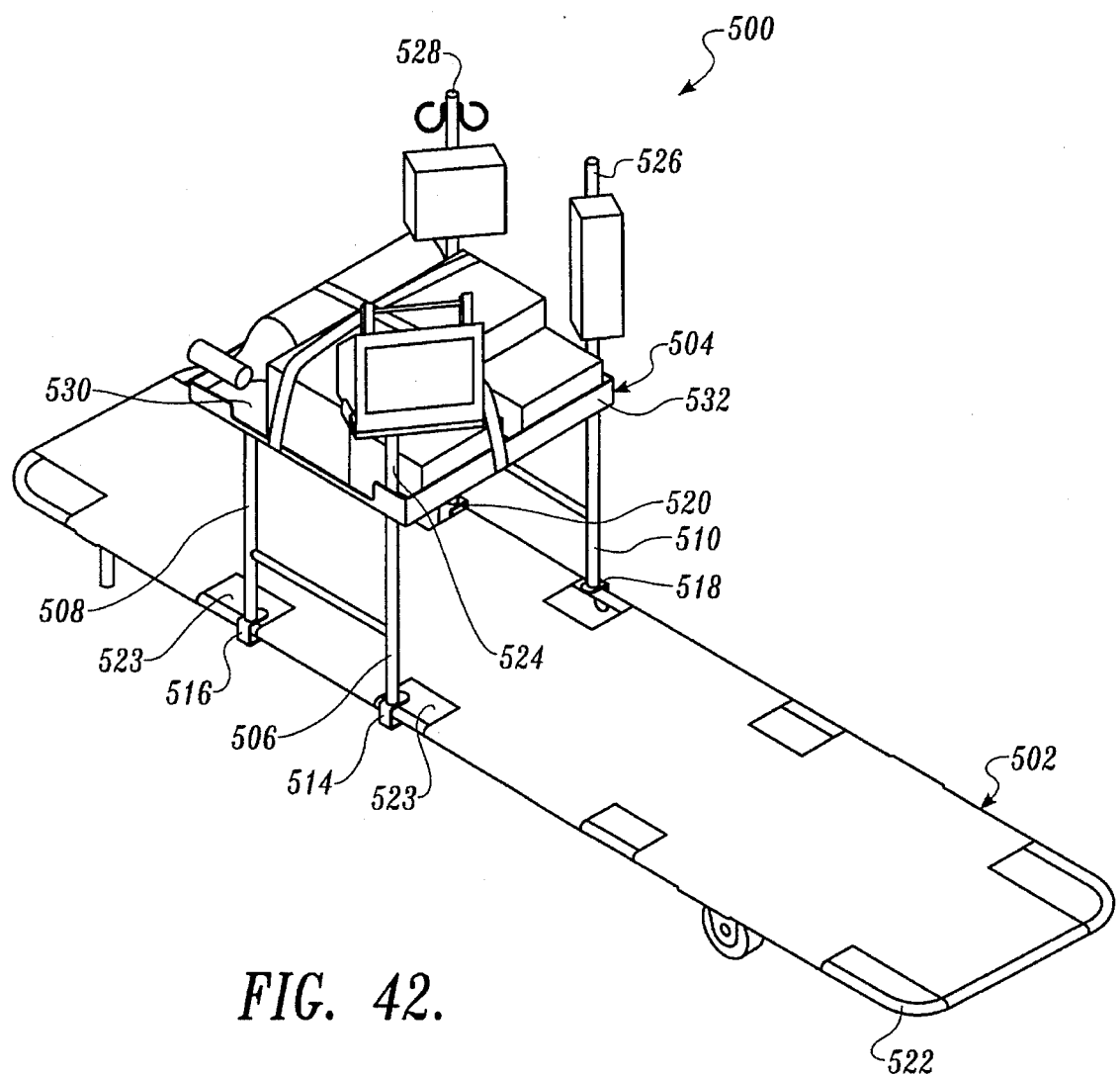
FIG. 42 is a top right perspective of a patient litter and a bridge assembly for supporting medical equipment in accordance with the present invention.

As shown in FIG. 42, assembly 500 is actually coupled to the litter 502 such that it will bridge over the patient and hold the desired portable medical equipment above the patient ready for use. Referring to FIG. 42, bridge assembly 500 includes a tray 504 having four legs 506, 508, 510, 512 extending downwardly therefrom. Foot couplings 514, 516, 518, 520 are affixed to the bottom ends of legs 506, 508, 510, and 512, respectively, to couple the tray to the litter frame. Bridge assembly 500 also includes extension posts 524, 526, 528, which can be coupled to the upper ends of selected legs so as to project above the tray.

Tray 504 has a generally rectangular shape with a flat portion 530 in a plane parallel to stretcher frame. Tray sides 532 extend upwardly from flat portion 530 of tray 504 to confine medical equipment supported on the tray. Tie-down straps 534 have end portions secured beneath tray 504 and can be used to help secure the equipment.

Bridge assembly 500 is coupled to the stretcher frame by first fitting the right forward foot coupling 514 and the right aft foot coupling 516 over the right side of the litter frame. See FIGS. 44 and 45. These foot couplings 514, 516 have C-shaped sections with the opening facing inward. Therefore, once slipped over the right side of frame 522 in openings 523 of the canvas sheet (FIG. 42), the couplings restrain movement of stretcher bridge 500 in all directions except laterally outward.

Once the right foot couplings 514, 516 are in place, the left side of bridge assembly 500 is lowered into place. The left foot couplings include a left forward foot coupling 518 and a lea aft foot coupling 520 attached to left forward leg 510 and left aft leg 512, respectively. Left forward foot coupling 518 is in the form of an inverted L-shape. Once it is lowered into place onto the left side of the litter frame, it restrains movement in an inward lateral direction and in a downward direction. Left aft foot coupling 520 is in the shape of an inverted U. Once it is slipped over the left side of the litter frame, a retainer pin 536 is placed through holes in the arms of the inverted U so as to trap the stretcher frame within the U. With retainer pin 536 inserted, bridge assembly 500 is secured to litter L. Because of the unique combination of the C-shaped foot couplings 514, 516 on the right side of litter frame 522 and the U-shaped left aft foot coupling 520 with retainer pin 536, bridge assembly 500 is secure from movement in any direction. This unique combination of foot couplings also allows bridge assembly 500 to be easily placed on the litter frame with a minimum of effort and only one retainer pin 536. Thus, bridge assembly 500 with the portable medical equipment can quickly and easily be attached or detached from the litter as the patient is moved.

Figure 43:
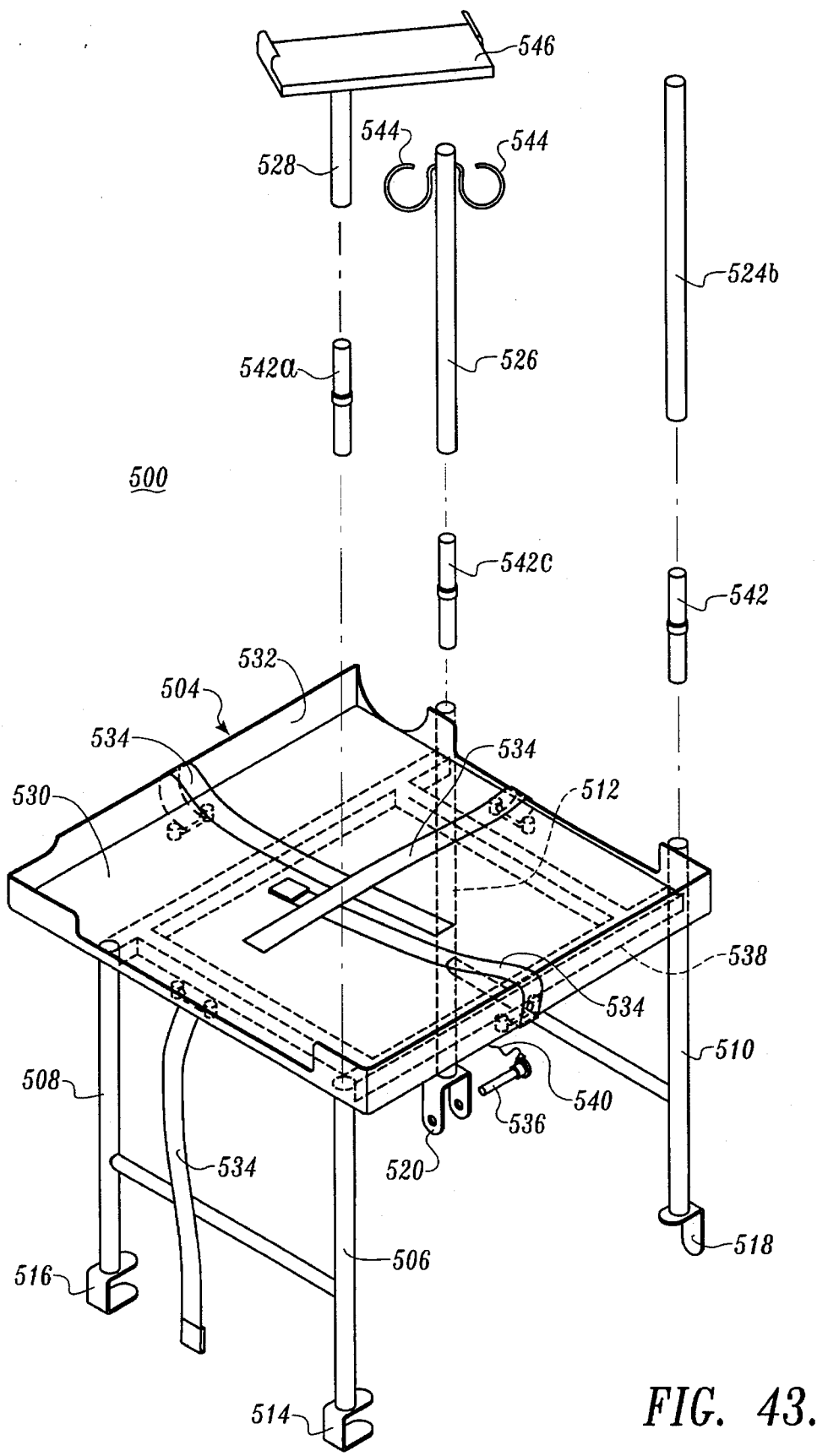
FIG. 43 is a top right perspective of the bridge assembly of FIG. 42 with parts shown in exploded relationship.
Figure 44:
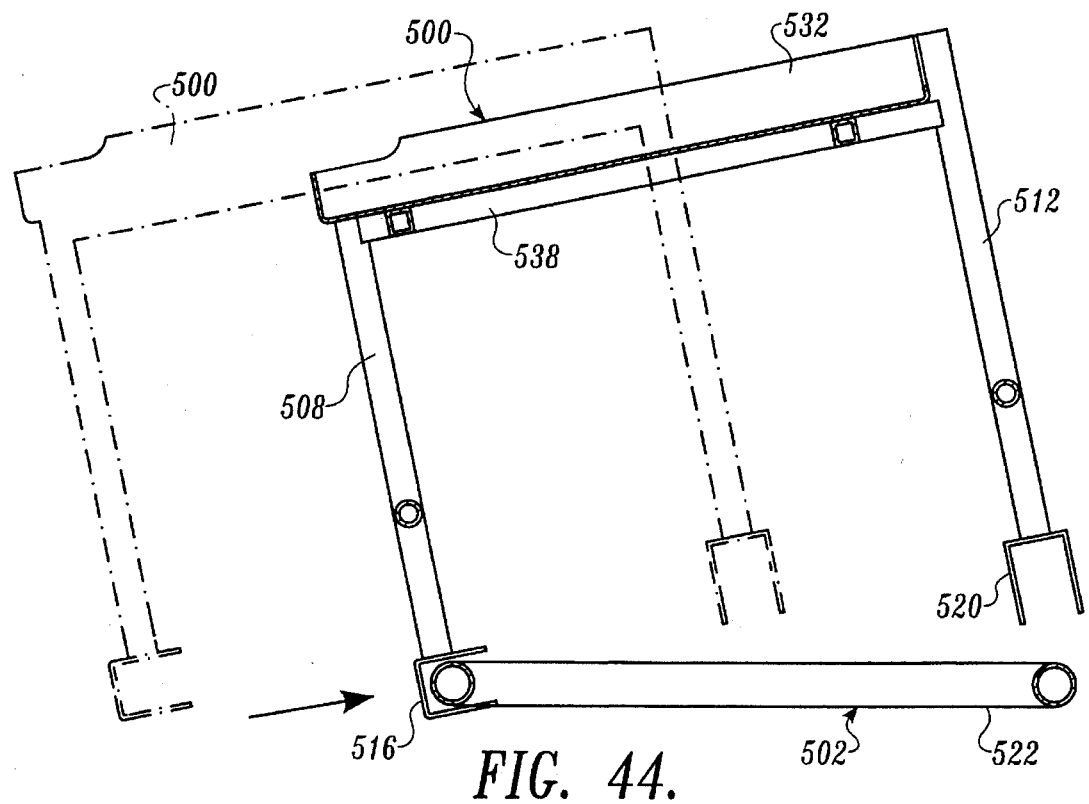
FIG. 44 is a first end elevation illustrating interconnection of the bridge assembly with the frame of a patient litter, with parts in different positions and parts broken away.
Figure 45:
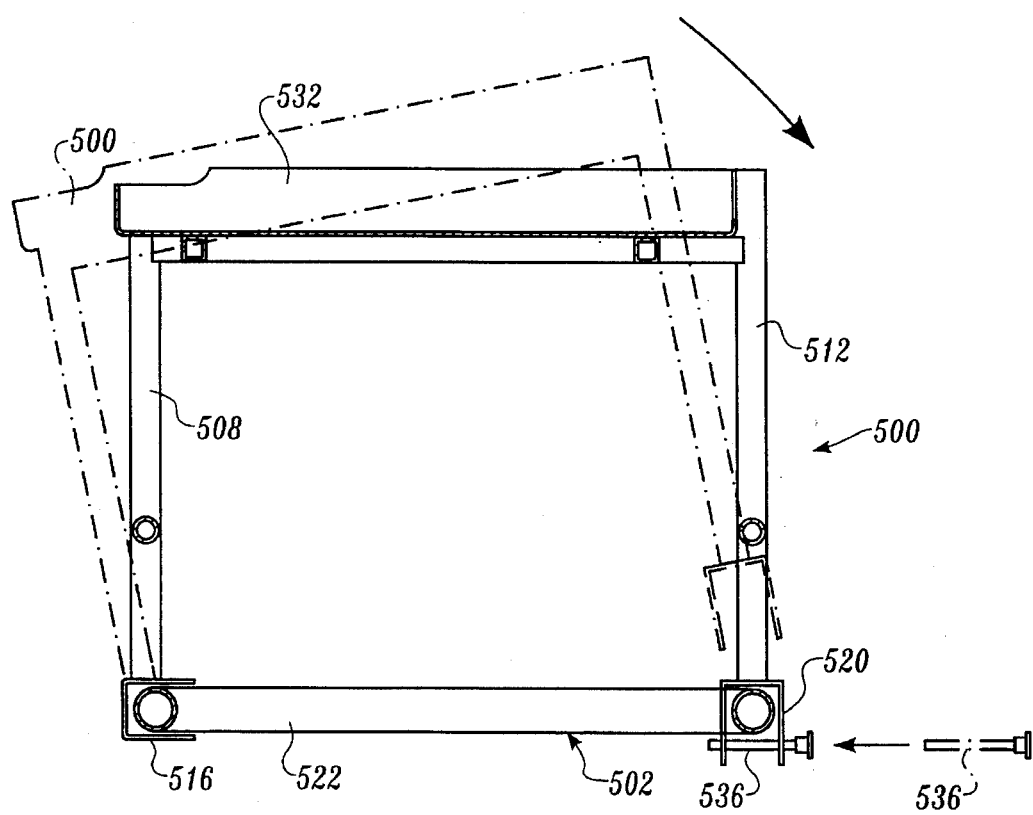
FIG. 45 is a second end elevation illustrating interconnection of the bridge assembly with the frame of a patient litter, with parts in different positions and parts broken away.

Other construction details of the bridge assembly can be seen in FIG. 43. A tray support frame 538 extends between legs 506, 508, 510, 512 beneath tray 504. Tray sides 532, which extend 90° from flat portion 530, are contoured so as to conform to the placement of the medical equipment, such as an oxygen tank, defibrillators, or other bags and equipment. Tray support frame 538 includes braces extending between right forward leg 506 and right aft leg 508 and between left forward leg 510 and left aft leg 512. These support braces are oriented generally horizontally. Retainer pin 536 is protected from loss with a small wire 540 which couples it to left aft leg 512.

FIG. 43 also illustrates the construction and coupling of extension posts 524, 526, 528. Each extension post includes a leg coupling 542, which is force fit into the extension post and may be slid into the open top of any one of the tubular legs 506, 508, 510, 512. In the preferred embodiment, three posts 524, 526, 528 are used, a left forward extension post 524, a left aft extension post 526, and a right forward extension post 526. Left forward extension post 524 is force fit with leg coupling 542a and slides within the upper end of left forward leg 510. Medical devices may simply be clamped to left forward extension post 524. Left aft extension post 526 is force fit with leg coupling 542b, which can then be slid within the top of left aft leg 512 so as to form an upward extension of that leg in a direction perpendicular to flat portion 530 and tray 504. The upward end of left aft extension post 526 includes equipment hooks 544 to hang medical fluid bags and the like. Right forward extension post 528 also includes leg coupling 542c force fit therein which may be slid within right forward leg 506. Right forward extension post 528 includes an equipment attach plate 546 secured to its upper end. Equipment attach plate 546 may be used to secure portable monitors and other medical equipment.

Alternate embodiments of the stretcher bridge apparatus can be utilized. For example, left forward foot coupling 518 could have an inverted U-shape instead of an inverted L-shape and still perform essentially the same functions. Alternatively, three legs could be used with, for example, two C-shaped foot couplings and one inverted U-shaped coupling with retainer pin 536 on the opposite side of frame 522 from the C-shaped couplings.

While the preferred embodiment of the invention has been illustrated and described, it will be appreciated that various changes can be made therein without departing from the spirit and scope of the invention.

I claim:

1. An apparatus for positioning and securing a patient support relative to an interior of a vehicle having a floor comprising;

a first tray for removably receiving the patient support wherein the patient support can be secured to said first tray for transportation of the patient; and a first base on the floor of the vehicle, said first tray being removably, telescopically connected to said first base such that said first tray can be telescopically, longitudinally extended relative to said first base, said first tray being pivotally attached to said first base for pivotal movement of said first tray, said first base including means for vertically lifting and lowering said first tray relative to the floor, wherein said first base includes a foundation member and a second tray, said second tray being located between said first tray and said foundation member such that said first tray and said second tray are removably, telescopically connected whereby said first tray can be telescopically, longitudinally extended relative to said second tray, and wherein upon telescopic, longitudinal extension of said first tray relative to said second tray, said first tray is removable from said second tray and is securable in said vehicle at a location remote from said second tray and said first base for sequential loading of more than one patient support.

2. The apparatus of claim 1 further comprising a second base on which said first tray is securable in said vehicle at said location remote from said second tray.

3. The apparatus of claim 2 wherein said first base and said second base each have a longitudinal axis, said longitudinal axes of said first base and said second base being substantially parallel.

4. The apparatus of claim 3 wherein said longitudinal axes of said first base and said second base are substantially coaxial when said means for vertically lifting and lowering said first tray has lifted said first tray a predetermined distance such that said first tray can be transferred from said first base to said second base.

* * * * *